US007099904B2

(12) United States Patent
Nakatsuka

(10) Patent No.: US 7,099,904 B2
(45) Date of Patent: Aug. 29, 2006

(54) COMPUTER SYSTEM FOR ALLOCATING STORAGE AREA TO COMPUTER BASED ON SECURITY LEVEL

(75) Inventor: Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 10/828,287

(22) Filed: Apr. 21, 2004

(65) Prior Publication Data
US 2005/0192923 A1 Sep. 1, 2005

(30) Foreign Application Priority Data
Feb. 27, 2004 (JP) ............................ 2004-052700

(51) Int. Cl.
*G06F 17/30* (2006.01)
(52) U.S. Cl. ..................... 707/205; 707/10; 707/9; 707/1; 713/161; 713/165
(58) Field of Classification Search ............... None
See application file for complete search history.

(56) References Cited

U.S. PATENT DOCUMENTS

| 6,336,187 B1* | 1/2002 | Kern et al. .................. 713/161 |
| 6,446,209 B1* | 9/2002 | Kern et al. .................. 713/193 |
| 6,738,877 B1 | 5/2004 | Yamakawa et al. |
| 6,751,729 B1* | 6/2004 | Giniger et al. .............. 713/153 |
| 6,754,718 B1* | 6/2004 | Dobberpuhl et al. ........ 709/250 |
| 2002/0078227 A1 | 6/2002 | Kronenberg |
| 2002/0174306 A1 | 11/2002 | Kumar et al. |
| 2003/0084290 A1 | 5/2003 | Murty et al. |
| 2003/0115447 A1 | 6/2003 | Pham et al. |
| 2003/0140193 A1 | 7/2003 | Acharya et al. |
| 2003/0158966 A1 | 8/2003 | Sato |
| 2003/0163568 A1 | 8/2003 | Kano et al. |
| 2003/0225801 A1 | 12/2003 | Devarakonda et al. |
| 2003/0229690 A1 | 12/2003 | Kitani et al. |
| 2004/0093524 A1 | 5/2004 | Sakai |
| 2004/0133634 A1* | 7/2004 | Luke et al. .................. 709/203 |
| 2004/0153642 A1 | 8/2004 | Plotkin et al. |
| 2005/0044199 A1* | 2/2005 | Shiga et al. ................. 709/223 |

FOREIGN PATENT DOCUMENTS

JP 2001-265655 9/2001

OTHER PUBLICATIONS

"iSCSI for Storage Networking", source(s): SNIA IP Storage Forum, pp. 1-7.
"iSCSI for Building Blocks for IP Storage Networking", source(s): SNIA IP Storage Forum, pp. 1-12.
"Towards Securing information End-to-End: networked Storage Security Update and Best Practices", source(s): Hitachi, pp. 1-26.
"Gaining Control of Security Patch Management", source(s): Microsoft, pp. 1-24.

* cited by examiner

*Primary Examiner*—Jean M. Corrielus
(74) *Attorney, Agent, or Firm*—Mattingly, Stanger, Malur & Brundidge, P.C.

(57) ABSTRACT

A management server takes charge of managing information about whether a physical port is provided with means for security protection. Based on such information, the management server automatically determines to which physical port a volume is to be assigned. As such, an assignment process is executed.

16 Claims, 24 Drawing Sheets

FIG. 2

| NODE IDENTIFIER 201 | OBJECT IDENTIFIER 202 | IP ADDRESS 203 | NODE TYPE 204 | PROVIDED WITH IPSec? 205 | AUTHENTICATION IDENTIFIER 206 | PASSWORD 207 |
|---|---|---|---|---|---|---|
| Host1 | iqn.2003-01.com.example: host1 | 10.10.10.101 | HOST | YES | 10.10.10.101 | aaaaaa |
| Host2 | iqn.2003-02.com.example: host2 | 10.10.10.102 | HOST | NO | - | - |
| Host3 | iqn.2003-03.com.example: host3 | 10.10.10.103 | HOST | YES | 10.10.10.103 | cccccc |
| Storage1 | iqn.2003-03.com.example: storage1 | 10.10.10.201 | STORAGE | YES | 10.10.10.201 | dddddd |
| Storage1 | iqn.2003-04.com.example: storage1 | 10.10.10.202 | STORAGE | NO | - | - |
| Storage2 | iqn.2003-05.com.example: storage2 | 10.10.10.203 | STORAGE | YES | 10.10.10.203 | ffffff |
| Storage2 | - | 10.10.10.204 | STORAGE | NO | - | - |
| Storage3 | iqn.2003-06.com.example: storage3 | 10.10.10.205 | STORAGE | YES | 10.10.10.205 | hhhhhh |

FIG. 4

| DEVICE NAME 401 | OBJECT IDENTIFIER 402 | LUN 403 | IP ADDRESS 404 | TCP PORT NUMBER 405 |
|---|---|---|---|---|
| /dev/sda | iqn.2003-03.com.example: storage1 | 0 | 10.10.10.201 | 3260 |
| /dev/sdb | | 1 | | |
| /dev/sdc | iqn.2003-05.com.example: storage2 | 0 | 10.10.10.203 | 3261 |
| /dev/sdd | | 1 | | |

FIG. 5

| PHYSICAL VOLUME NUMBER | LUN | CAPACITY | IP ADDRESS OF ASSIGNED PHYSICAL PORT | TCP PORT NUMBER | OBJECT IDENTIFIER OF ASSIGNED PHYSICAL PORT | PROVIDED WITH IPSec? |
|---|---|---|---|---|---|---|
| VOL. 0 | 0 | 200GB | 10.10.10.201 | 3260 | iqn.2003-01.com.example: storage1 | YES |
| VOL. 1 | 1 | 400GB | | | | |
| VOL. 2 | 2 | 350GB | 10.10.10.202 | 3261 | iqn.2003-04.com.example: storage1 | NO |
| VOL. 3 | 3 | 600GB | | | | |

| OBJECT IDENTIFIER 1301 | IP ADDRESS 1302 | TCP PORT NUMBER 1303 | OBJECT IDENTIFIER OF ACCESSIBLE HOST 1304 |
|---|---|---|---|
| iqn.2003-03.com.example: storage1 | 10.10.10.201 | 3260 | iqn.2003-01.com.example: host1 |
| | | | iqn.2003-02.com.example: host2 |
| iqn.2003-04.com.example: storage1 | 10.10.10.202 | 3261 | iqn.2003-01.com.example: host1 |
| | | | iqn.2003-02.com.example: host2 |
| iqn.2003-05.com.example: storage2 | 10.10.10.203 | 3261 | iqn.2003-01.com.example: host1 |
| iqn.2003-06.com.example: storage3 | 10.10.10.204 | 3260 | iqn.2003-02.com.example: host2 |

FIG. 19

| PHYSICAL VOLUME NUMBER | LUN | CAPACITY | IP ADDRESS OF ASSIGNED PHYSICAL PORT | TCP PORT NUMBER | OBJECT IDENTIFIER OF ASSIGNED PHYSICAL PORT | PROVIDED WITH IPSec? |
|---|---|---|---|---|---|---|
| VOL. 0 | 0 | 200GB | 10.10.10.201 | 3260 | iqn.2003-01.com.example: storage1 | YES |
|  |  |  | 10.10.10.202 | 3260 |  | NO |
| VOL. 1 | 1 | 350GB | 10.10.10.201 | 3260 |  | YES |
|  |  |  | 10.10.10.202 | 3260 |  | NO |
| VOL. 2 | 2 | 600GB | 10.10.10.203 | 3261 | iqn.2003-02.com.example: storage1 | NO |
|  |  |  | 10.10.10.204 | 3260 |  | YES |
| VOL. 3 | 3 | 400GB | 10.10.10.203 | 3261 |  | NO |
|  |  |  | 10.10.10.204 | 3260 |  | YES |

| OBJECT IDENTIFIER OF ASSIGNED PHYSICAL PORT | IP ADDRESS OF ASSIGNED PHYSICAL PORT | TCP PORT NUMBER | PROVIDED WITH IPSec? | OBJECT IDENTIFIER OF ACCESSIBLE HOST |
|---|---|---|---|---|
| iqn.2003-01.com.example: storage1 | 10.10.10.201 | 3260 | NO | iqn.2003-01.com.example: host1 |
| iqn.2003-01.com.example: storage1 | 10.10.10.202 | 3260 | YES | iqn.2003-02.com.example: host2 |
| iqn.2003-02.com.example: storage1 | 10.10.10.203 | 3261 | NO | iqn.2003-01.com.example: host1 |
| iqn.2003-02.com.example: storage1 | 10.10.10.204 | 3260 | YES | iqn.2003-02.com.example: host2 |
| iqn.2003-03.com.example: storage2 | 10.10.10.205 | 3261 | YES | iqn.2003-01.com.example: host1 |

| DEVICE NAME 2301 | OBJECT IDENTIFIER 2302 | LUN 2303 | IP ADDRESS 2304 | TCP PORT NUMBER 2305 | PROVIDED WITH IPSec? 2306 |
|---|---|---|---|---|---|
| /dev/sda | iqn.2003-01.com.example: storage1 | 0 | 10.10.10.201 | 3260 | NO |
|  |  |  | 10.10.10.202 | 3260 | YES |
| /dev/sdb | iqn.2003-02.com.example: storage1 | 2 | 10.10.10.203 | 3261 | NO |
|  |  |  | 10.10.10.204 | 3260 | YES |
| /dev/sdc | iqn.2003-03.com.example: storage2 | 1 | 10.10.10.205 | 3261 | YES |

COMPUTER SYSTEM FOR ALLOCATING STORAGE AREA TO COMPUTER BASED ON SECURITY LEVEL

CROSS-REFERENCES TO RELATED APPLICATIONS

This application relates to and claims priority from Japanese Patent Application No. 2004-052700, filed on Feb. 27, 2004, the entire disclosure of which is incorporated herein by reference.

BACKGROUND OF THE INVENTION

The present invention relates to a storage area management method for use in a storage area network (hereinafter, "IP-SAN") for establishing a connection among a plurality of computers and storage systems over the Internet Protocol (IP) network.

For efficient data management in companies and other entities, establishing a Storage Area Network (SAN) is a popular option. A SAN is a network used for establishing a connection among a plurality of storage systems and computers. For data transfer over a SAN, the Fibre Channel Protocol is often used. In the description below, such a SAN is referred to as a FC-SAN.

Another type of SAN, i.e., an IP-SAN, using an iSCSI is recently has received considerable attention. Here, the iSCSI is a protocol used for transmitting and receiving SCSI commands and data over the IP network. The SCSI commands are those conventionally used for communications between computers and storage systems, and data is transferred based on those commands. For details about the iSCSI, refer to "iSCSI" authored by Julian Satran, et al., Jan. 19, 2003, IETF, (www.ietf.org/internet-drafts/draft-ietf-ips-iscsi-20.txt)>. Compared with a FC-SAN, an IP-SAN has an advantage in that any existing LAN (Local Area Network) equipment that is already in use as an infrastructure can be used therewith, for example.

The issue here is that an IP-SAN requires substantial consideration for security. This is because, unlike a FC-SAN, a network used for an IP-SAN may not always be secure enough, e.g., the Internet and an intracorporate LAN. Further, it is common knowledge that attack methods and attack programs have been developed specifically for the IP network.

For maintaining security with a SAN, a possibility is to provide access control between computers and storage systems, or encryption of the communication path. As a technique for realizing access control between computers and storage systems, zoning for partitioning a communication path using switches or fabric and LUN masking (Logical Unit Number masking) for end-to-end access control between ports, have been considered. The LUN masking technique is found in JP-A-2001-265655, for example.

For an IP-SAN, IPSec may be used to encrypt the communications path between computers and storage systems. For details about IPSec, refer to "Security Architecture for IP" authored by Stephen Kent and Randall Arkinson, November 1998, IETF, (www.ietf.org/rfc/rfc2401.txt). IPSec is a technique used for encrypting a communications path using a shared key. With IPSec, the shared key is managed under IKE (Internet Key Exchange), details of which are found in "The Internet Key Exchange (IKE)" authored by Dan Harkins and Dave Carrel, November 1998, IETF, (www.ietf.org/rfc/rfc2409.txt).

SUMMARY OF THE INVENTION

The problem here is that devices to be connected to an IP-SAN are not all necessarily equipped with means for security protection as mentioned above. For example, some devices to be connected to an IP-SAN may be implemented with IPSec, but some may not, and security protection is not necessarily always required for communications between computers and storage systems.

In such cases, for system configuration, system managers are required to always pay attention to such matters as whether devices connected to a network have a safeguard for security protection, and the security level of system components. While paying such attention, the system managers need to allocate storage systems connected to the network and their storage areas to computers also connected to the network. This problematically puts an enormous burden on the system managers. What is more, once such allocation settings are made by the system managers, computer users find it difficult to freely change the settings of storage area allocation. Further, the security level setting for communications between the computers and the storage systems may be unnecessarily high, resulting in a waste of system resources.

In order to solve the above-mentioned problems, the present invention is characterized by the following structure. That is, the present invention is directed to a system including a computer for managing information about computers and storage systems to be connected to a network. In the description below, such a computer is also referred to as a "network management server". In response to any request coming from the computers, the network management server selects any one of the storage systems that is capable of satisfying predetermined requirements, and then instructs the selected storage system to create a storage area. The storage system accordingly creates a storage area following the predetermined requirements, and, after completion, it forwards a creation completion notice to the network management server.

After receiving this notice, the network management server notifies the computers of information for using the thus created storage area, e.g., the network address assigned to a port of the storage system. Based on such information, the computers use the created storage area.

Herein, specifically, the information about the storage systems and others managed by the network management server is information about the security level. The request coming from the computers may also include a request about the security level. If this is the case, the network management server may search its own information for any storage system meeting the security level requested by the computers. The resulting storage system is then instructed to create a storage area.

Note here that the security level may be information indicating whether or not an encryption process is executable in the devices for data transmission and reception.

Other structures of the present invention will become more apparent from the following detailed description of exemplary embodiments.

BRIEF DESCRIPTION OF THE DRAWINGS

FIG. 2 is a diagram showing an exemplary structure of a port attribute table;

FIG. 4 is a diagram showing an exemplary structure of a disk path management table;

FIG. 5 is a diagram showing an exemplary structure of a volume information table;

FIG. 13 is a diagram showing an exemplary structure of a storage address information table;

FIG. 19 is a diagram showing an exemplary structure of a volume information table;

FIG. 20 is a diagram showing an exemplary structure of a storage address information table;

FIG. 23 is a diagram showing an exemplary structure of a disk path management table.

DESCRIPTION OF THE PREFERRED EMBODIMENTS

Figure 1:
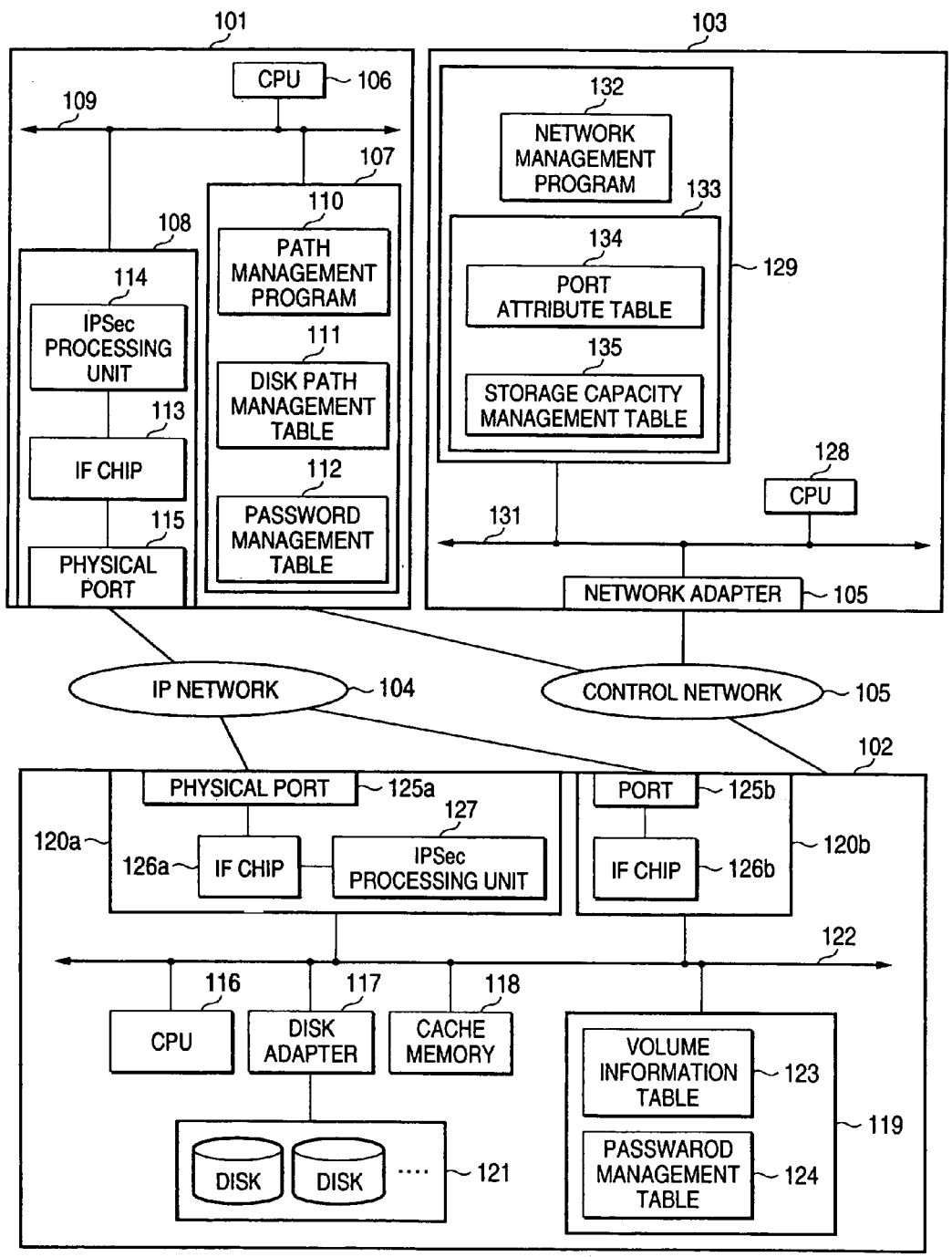
FIG. 1 is a block diagram showing an exemplary system structure of a first embodiment.

FIG. 1 is a diagram showing an example of the system structure of a first embodiment of the present invention. The system includes a computer (in the description below, also referred also to as a "server") 101, a storage system 102, and a network management server (in the below, referred also to as "management server") 103. The server and the storage system are connected to each other over an IP network 104. A control network 105 connects the server, the storage system and the management server.

Note here that the system shown by way of example in FIG. 1 has the IP network 104 and the control network 105 each provided as an independent network. Alternatively, these networks may be shared as a single network. The server 101 and the storage system 102 to be connected to the IP network 104 are both arbitrary in number.

The server 101 performs data transmission and reception with the storage system 102 over the IP network 104. The IP network 104 is one over which IP packets can be transferred. Specifically, such an IP network includes Ethernet LANs, Ethernet WANs (Wide Area Network), and wide area IP networks, lease lines, and other media provided by local exchange carriers.

The management server 103 performs transmission and reception of management information with the server 101 and the storage system 102 over the control network 105.

The server 101 is a general computer, and it is provided with a processor (in the description below, also referred to as a "CPU") 106, memory 107, and a host bus adapter (in the description below, also referred to as a "HBA") 108. The CPU 106, the memory 107, and the HBA 108 are connected together via a bus 109. The memory stores a path management program 110, a disk path management table 111, and a password management table 112. Herein, these programs are stored in the memory 107, for example, of the server 101 via a portable storage device or over a network.

Through the execution of the path management program 110, the processor 106 determines a data communications path between the server 101 and the storage system 102 over the IP network 104. This determination is based on information stored in the disk path management table 111 about paths between the server and the storage system. The processor 106 uses information coming from managers, users, other programs, and the like, as a basis for determining or changing the data communications path.

The path information stored in the disk path management table 111 is used by the server 101 to make access to the storage system 102 connected to the IP network 104. The disk path management table 111 also stores path property information, e.g., whether the path is provided with an encryption property using IPSec.

For data encryption using IPSec between the server 101 and the storage system before communication, it is necessary to set a cryptographic key needed for encryption to both the server 101 and the storage system 102 in charge of communications. There are two ways to manage the thus set cryptographic key: manual cryptographic key management and automatic cryptographic key management. With the iSCSI draft, however, manual cryptographic key management is prohibited. Also, with the iSCSI draft, an IKE automatic key management protocol is required to be incorporated for automatic cryptographic key management. At the time of key exchange under IKE, an authentication process is executed mutually between the server 101 and the storage system. The password management table 112 stores its own password, which is needed for such authentication under IKE. Here, when the present invention is used under the circumstances that the iSCSI draft is not necessarily implemented, key setting may be carried out with manual cryptographic key management, or with automatic cryptographic key management other then IKE.

The HBA 108 is connection equipment used for establishing a connection between the server 101 and the IP network 104. The HBA 108 has an Interface chip (hereinafter, referred also to as "IF chip") 113, a physical port 115 for connection to the IP network 104, and an IPSec processing unit 127. The physical port 115 is always used for data transfer between the server 101 and the IP network 104.

The IF chip 113 is a circuit for exercising control over a packet process for packet transmission and reception to/from the IP network 104, e.g., SCSI command encapsulation, and DMA (Direct Memory Access) transfer between the physical port 115 and the memory 107 of the server 101, and others.

The IPSec processing unit 127 is a processor used for going through processes of data encryption and decryption before communications, cryptographic key exchange and authentication between devices, for example. Prior to authentication, the IPSec processing unit 127 searches the password management table 112 stored in the memory 107 for a password needed for authentication of the device on the other end.

Note that the HBA 108 in the present embodiment is assumed to execute processes required for encrypted transfer using IPSec. The issue here is that the HBA 108 of the server 101 may not always be capable of going through the IPSec process. Accordingly, for distinction hereinafter, a HBA 108 capable of going through the IPSec process is referred to as HBA 108*a*, and the one not capable of going through the IPSec process is referred to as HBA 108*b*.

The storage system 102 is provided with host adapters 120*a* and 120*b*, a CPU 116, a disk adapter 117, memory 119, cache memory 118, and disk device group 121. A bus 122 establishes a connection among the host adapters 120*a* and 120*b*, the CPU 116, the disk adapter 117, the memory 119, and the cache memory 118. Instead of such a bus 122, a switch may be provided as an alternative option. The disk adapter 117 connects together the disk device group 121 and the bus 122. The memory 119 stores a volume information table 123, and a password management table 124.

The CPU 116 makes access to the memory 119 via the bus 122 to execute a program stored in the memory 119. The disk adapter 117 exercises access control over the CPU 116 with respect to the disk device group 121. The cache memory 118 temporarily stores data to be transferred to the server 101 or data coming therefrom.

The disk device group 121 includes one or more disk devices. Herein, instead of non-volatile memory, such as a disk device, the disk device group 121 may plurally include a volatile memory, such as a flash memory card. Each disk device has a physical storage area. From such a physical storage area belonging to each corresponding disk device, the storage system 102 creates a logical storage area (in the description below, referred to as a "physical volume"). Using the physical volume as a unit, the storage system 102 handles its own storage area as a single logical storage. Here, the disk device group structuring the physical volume may be in the RAID structure.

The storage system 102 creates a volume from one or more physical volumes. The volume is a unit of the logical storage area that is provided to the server 101, and it is equivalent to a logical unit (LU) used with the SCSI protocol, for example.

The host adapters 120 each include a physical port 125 that is to be connected to the IP network 104. The host adapter 120*a* also includes the IPSec processing unit 127 for executing a process needed for encrypted transfer using IPSec. In the present embodiment, the storage system 102 includes, one each, the host adapter 120*a* that executes a process for encrypted transfer using IPSec, and the host adapter 120*b* that does not execute such a process. The number of the host adapters 120 is not surely restrictive, and the storage system 102 may include an arbitrary number of host adopters 120*a* and 120*b*, respectively. As another alternative option, the storage system 102 may include either of the host adapter 102*a* or 102*b*.

The volume information table 123 stores information that shows the interrelation between physical volumes and volumes. To be specific, the table 123 stores a volume number corresponding to a specific physical volume (hereinafter, referred to as a logical unit number (LUN), a volume capacity, and identifier (ID) information (e.g., address) of the physical port 115 assigned to the volume. Every time a volume is newly created, the storage system 102 updates the contents of the volume information table 123.

The password management table 124 stores a password needed for authentication under IKE when the host adapter 120*a* of the storage system 102 executes the IPSec process.

The management server 103 is a general computer, and it includes a processor (in the description below, also referred to as a "CPU") 128, a memory 129, and a network adapter 130. A bus 131 establishes a connection among the CPU 128, the memory 129, and the network adapter 130. The memory 129 stores a network management program 132 and a network configuration database 133.

The network configuration database 133 includes a port attribute table 134 and a storage capacity management table 135.

With the port attribute table 134, information is registered for the management server 103 to manage the physical port connected to the IP network 104. To be specific, with respect to a specific physical port, the table 134 registers a node identifier (ID) for uniquely distinguishing a device having a physical port, an address for any other devices to access the physical port, and information about whether an HBA or a host adapter having a physical port can execute the IPSec process.

With the storage capacity management table 135, information is registered for the management server 103 to manage the storage capacity of the storage system 102 connected to the IP network 104. To be specific, the information indicates the still-available capacity (hereinafter, "unused capacity") of the storage area and the already-used capacity thereof (hereinafter, "capacity of used area" or "used capacity") in the respective storage systems 102 connected to the IP network 104. Such information is registered with the storage capacity management table 135 for every storage system 102.

The processor 128 of the management server 103 executes the network management program 132 for information collection via the control network 105. Herein, the information concerns the physical ports located in the server 101 and the storage system 102 and indicates the unused capacity and the used capacity in the storage. Then, based on thus collected information, the management server 103 creates or updates the port attribute table 134 and the storage capacity management table 135.

When a volume creation request comes from the server 101, the system manager, or the like, the management server 103 responsively makes a search of the contents of the port attribute table 134 and the storage capacity management table 135. After the search, another request for creating a volume satisfying the requirements is issued with respect to the storage system 102. Further, after receiving a volume creation completion notice from the storage system 102, the management server 103 communicates completion of volume creation to the server 101, the manager, or others. Herein, the server 101 or the system manager is the one having issued the volume creation request. Then, the management server 103 collects passwords needed for authentication at the time of IKE, and it issues a command for the server 101 and the storage system 102 to register any newly input password with the password management tables 112 and 117.

The contents of the respective tables included in each device will now be described. In the present embodiment, although information is managed in the form of a table, this is not surely restrictive.

FIG. 2 is a diagram showing an exemplary structure of the port attribute table 134, which stores property information about the physical ports 115 and 125 (hereinafter, referred to as collectively "physical port 115 and others" or simply "physical port") connected to the IP network 104.

The port attribute table 134 has entries corresponding in number to the physical ports 115 and others connected to the IP network 104. Each entry includes fields 201 to 207. Specifically, the field 201 is registered with a node ID for identifying which device includes the physical port 115 and others corresponding to the entry; the field 202 is registered with an object identifier (ID) of an SCSI object assigned to the corresponding physical port 115 and others; the field 203 is registered with an IP address assigned to the corresponding physical port 115 and others; the field 204 is registered with a node type that is information for distinguishing which device has the corresponding physical port 115 and others, i.e., the server 101 or the storage system 102; the field 205 is registered with information indicating whether the HBA 108 or the host adapter 120 having the corresponding physical port 115 and others includes an IPSec processing unit; the field 206 is registered with an authentication identifier (ID); and the field 207 is registered with a password.

Here, assignment of an SCSI object to a physical port means that the server 101 determines which physical port to use when using an SCSI object. Accordingly, once determined, the server 101 is not allowed to use an SCSI object using any other physical port.

The object ID is an SCSI object identifier that is defined by SAM (SCSI Architecture Model). Herein, the SCSI object is a generic term for a device from which an SCSI command is issued (logically or physically: hereinafter, "SCSI initiator"), and a device that receives the SCSI command (logically or physically: hereinafter, "SCSI target"). The object ID is equivalent to an iSCSI name with iSCSI, and WWN with FC. The device to be connected to the IP network 104 can have one or more SCSI objects. In the FIG. 2 example, the storage system 102 having a node ID of "Storage 1" has two SCSI objects (in this example, SCSI targets) of iqn.2003-03.com.example:storage1, and iqn.2003-04.com.example:storage1.

In the case that the physical port 115 and others are assigned to no SCSI object, for example, the field 202 will be blank. In the FIG. 2 example, in the storage system 102 having a node ID of "Storage 2", the physical port having assigned with the IP address of 10.10.10.204 has the blank field 202. This indicates that this physical port is assigned to no SCSI object.

The authentication ID identifies which terminal is in charge of key exchange at the time of IKE authentication during an encryption process using IPSec. The authentication ID is assigned to every physical port in which the IPSec can be used. The authentication ID may be the IP address assigned to the physical port, a combination of IP address and network mask, or the node ID.

The password is used for IKE authentication, and similarly to the authentication ID, it is assigned to every physical port in which the IPSec can be used. The field 207 stores, as passwords, password character strings under the Pre-shared key mode for password setting or digital signatures, if used, those approved by the Certificate Authority. In the FIG. 2 example, as to the physical port 115 in "Host 1", which has been assigned with the IP address of 10.10.10.101, the IP address is used as the authentication ID with the Pre-Shared key mode for password setting, and, thus, the field 206 stores 10.10.10.101, and the field 207 stores a password character string of aaaaaa.

The port attribute table 134 is under the management of the management server 103. The management server 103 updates the port attribute table 134 responding to any addition to the system of new physical port 115 and others, new volume assignment to the physical port 115 and others, or password setting.

Figure 3:
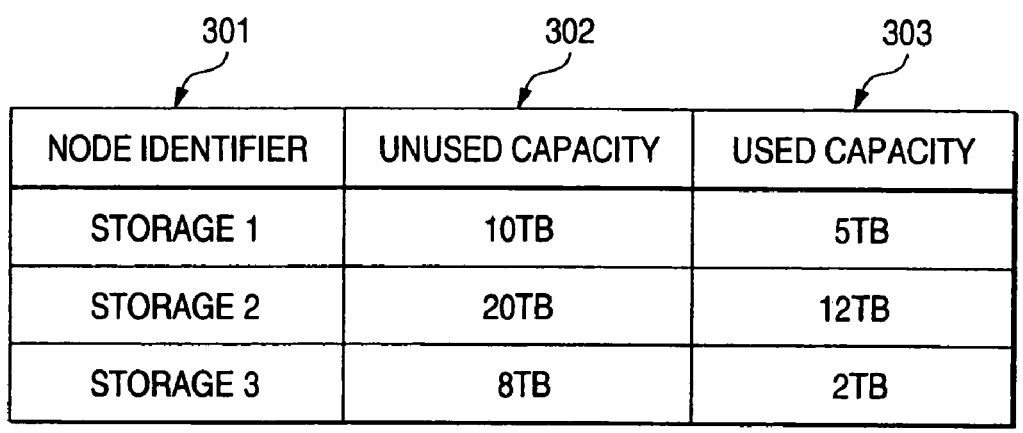
FIG. 3 is a diagram showing an exemplary structure of a storage capacity management table.

FIG. 3 is a diagram showing an exemplary structure of the storage capacity management table 135, which stores information about storage area usage in the storage system 102 connected to the IP network 104.

The storage capacity management table 135 has entries corresponding in number to the storage systems 102, for example, connected to the IP network 104. Each entry includes fields 301 to 303. Specifically, the field 301 is registered with a node ID for identifying the corresponding storage system 102; the field 302 is registered with information about the unused capacity of the corresponding storage system 102; and the field 303 is registered with information about the used capacity of the corresponding storage system 102.

The unused capacity is information indicating how much storage capacity is left unused with no physical volume created in the storage area of the disk device group 121 of the storage system 102. The used capacity tells how much storage capacity is already in use as physical volumes in the storage area of the disk device group 121.

In the FIG. 3 example, the storage area of "Storage 1" has 10T-Bytes of unused capacity and 5T-Bytes of used capacity. Herein, the storage capacity management table 135 is under the management of the network management program 132. Accordingly, every time the storage system connected to the IP network 104 is created (or deleted) with any new physical volume, the network management program 132 responsively updates the contents of the storage capacity management table 135.

FIG. 4 is a diagram showing an example of the disk path management table 111 in the server 101. The disk path management table 111 stores names of virtual storages (in the description below, "disk devices") to be used by the server 101 via the IP network 104, and information for the server 101 to access these disk devices. The disk path management table 111 has entries corresponding in number to the disk devices to be used by the server 101.

Each entry includes fields 401 to 405. Specifically, the field 401 is registered with a device name provided in the server 101 to the corresponding disk device; the field 402 is registered with an object ID of an SCSI object including the corresponding disk device; the field 403 is registered with a LUN of a volume corresponding to the disk device; the field 404 is registered with an IP address of a physical port assigned to the SCSI object including the corresponding disk device; and the field 405 is registered with a TCP port number of the physical port assigned to the SCSI object including the corresponding disk device.

Here, the disk device is a unit used for the storage area in programs exemplified by an operating system ("OS") to be executed by the server 101. The disk device is structured by one or more volumes. In the present embodiment, the device name is exemplified by "/dev/had", as shown in FIG. 4. The contents of the disk path management table 111 may be set manually by system managers, and the device names and others may be set arbitrarily by the OS on the server 101 or the path management program 110.

Alternatively, one SCSI object, e.g., SCSI target, may include a plurality of disk devices, or a plurality of SCSI objects may structure a single disk device. The SCSI object is the one structured by one or more volumes.

FIG. 5 is a diagram showing an example of the volume information table 123 in the storage system 102. The volume information table 123 stores property information of the physical volumes created by the respective storage systems 102. The volume information table 123 has entries corresponding in number to the physical volumes of the storage system 102. Each entry has fields 501 to 507. Specifically, the field 501 is registered with a physical volume number that is an identifier of the corresponding physical volume; the field 502 is registered with a LUN of a volume corresponding to the physical volume; the field 503 is registered with the capacity of the corresponding physical volume; the field 506 is registered with an object ID of an SCSI object including the corresponding physical volume; the field 504 is registered with an IP address assigned to the physical port interrelated to the SCSI object including the corresponding physical volume; the field 505 is registered with a port number of a TCP port to be used for establishing a TCP connection with the SCSI object including the corresponding physical volume; and the field 507 is registered with information indicating whether or not an IPSec processing unit is included in an HBA or others having the physical port corresponding to the physical volume.

The volume information table 123 is under the management of the storage system 102. Thus, after creation of physical volumes, the storage system 102 creates volume properties every time any volume is created from the resulting physical volumes. Thus created volume properties are registered with the volume information table 123.

Figure 6:
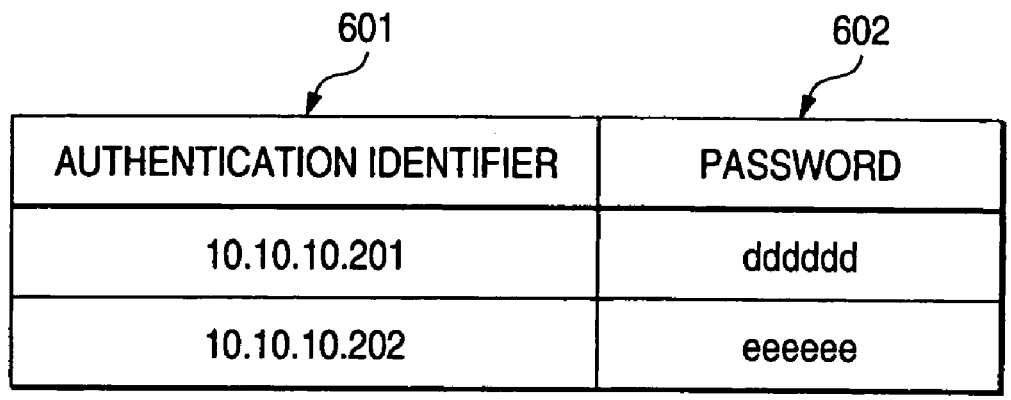
FIG. 6 is a diagram showing an exemplary structure of a password management table.

FIG. 6 is a diagram showing an example of the password management table 124 in any device connected to the IP network 104. The password management table 124 has entries corresponding in number to the other devices with which encrypted transfer is performed. Each entry has fields 601 and 602. Specifically, the field 601 is registered with information about an authentication ID of the other device for encrypted transfer using IPSec, and the field 602 is registered with a password used for authentication under IKE during the encrypted transfer.

The password management table 112 is updated in response to every password registration.

In the present embodiment, if a user or a manager of the server 101 wants to newly use the storage area of the storage system 102, the user issues a volume creation request to the management server 103. In the request, the user includes also a request for the property (in this example, security level) of the resulting volume. After receiving such a volume creation request, the management server 103 searches the port attribute table 134 and the storage capacity management table 135 for the storage device 102 that is capable of volume creation meeting the user's request (in this example, storage capacity and security level).

If the storage system 102 meeting the user's request is found, the management server 103 instructs the thus found storage system 102 for volume creation as requested by the user. Especially if the security level (in this example, encrypted transfer using IPSec) requested by the user is high, the management server 103 instructs the storage system 102 to assign the resulting volume to the physical port belonging to the HBA or others including the IPSec processing unit. In the description below, such a physical port is referred to as physical port with IPSec.

Then, after receiving a completion notice from the storage system 102 indicating that the volume creation is complete, the management server 103 forwards the completion notice and information to the user, e.g., to the server 101 or manager. Herein, the information is that needed to use the volume, such as the IP address corresponding to the volume. In response to the completion notice, the user uses the thus provided information to use the created volume, e.g., disk device creation using the volume. In the case where the server 101 carries out communications with respect to the volume thus secured with security, the server 101 first forwards an authentication ID and a password in accordance with IPSec protocol to the storage system 102 including the volume. Using the thus provided authentication ID and the password, the storage system 102 authenticates the server 101. If the server 101 is authenticated by the storage system 102, the server 101 encrypts data to be stored in the volume, and the resulting data is transmitted to the storage system 102.

The processing procedure of the present embodiment will be described in detail.

Figure 7:
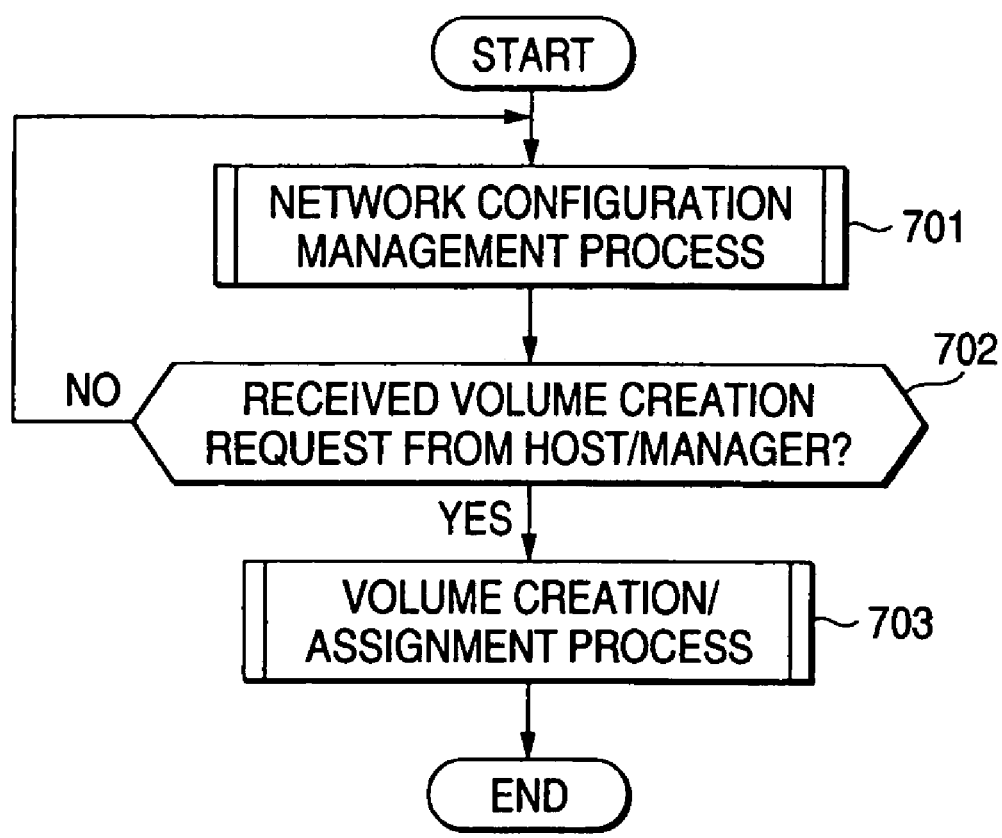
FIG. 7 is a flow diagram showing an exemplary procedure for a volume assignment process.

FIG. 7 is a diagram showing an example of the overall procedure of a volume assignment process of the present embodiment. First, the management server 103 executes a network configuration management process until a volume creation request comes from the server 101 or a manager (Step 701). When receiving a volume creation request from the server 101 or the manager (Step 702), the management server 103 accordingly executes a volume creation/assignment process (Step 703). After this process, any new volume becomes available for the server 101. The Steps 701 and 703 will be described in detail later.

Figure 8:
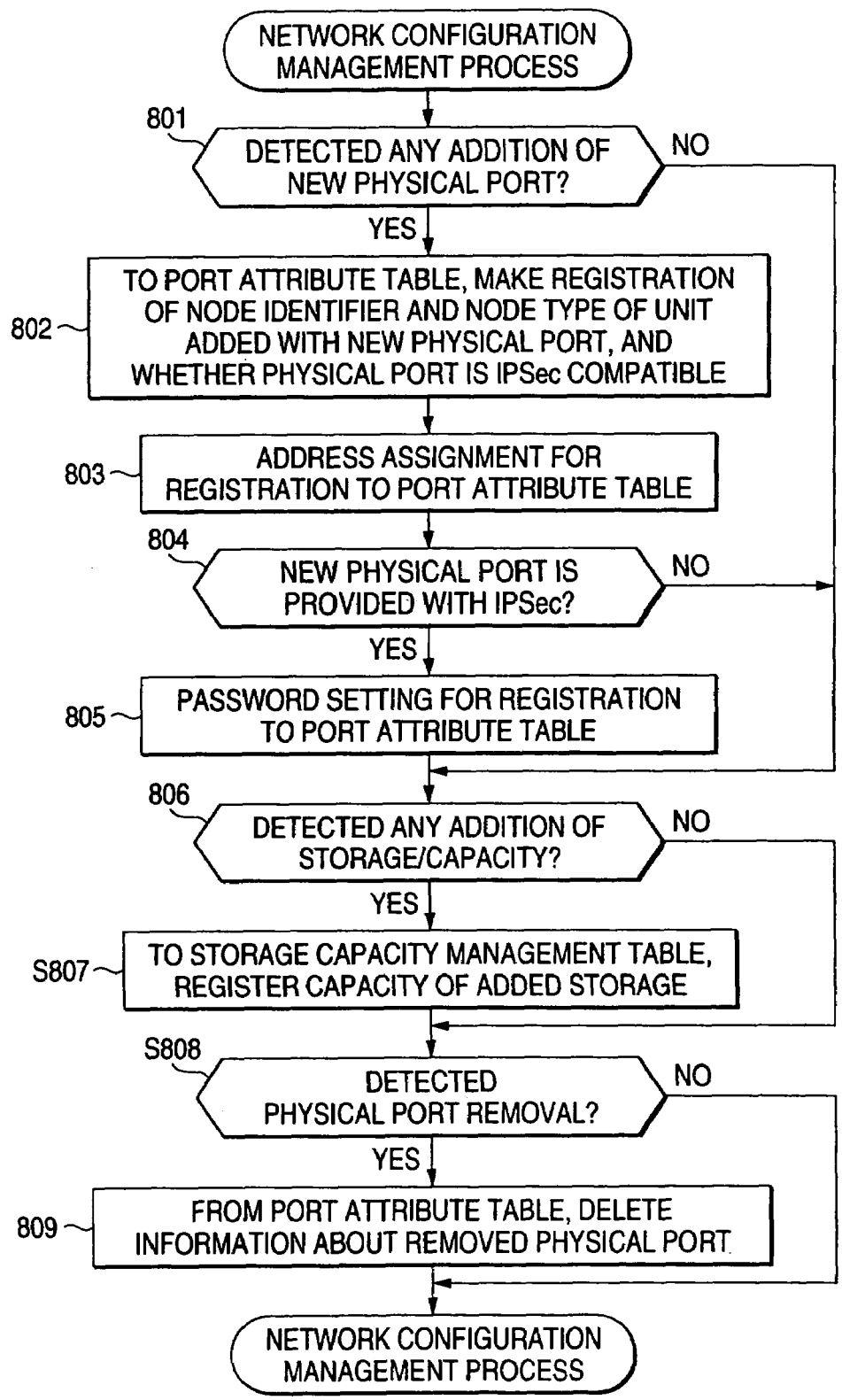
FIG. 8 is a flow diagram showing an exemplary procedure for a network configuration management process.

FIG. 8 is a diagram showing the procedure of the network configuration management process to be executed by the management server 103. In the network configuration management process, the management server 103 updates the contents of various tables by detecting any addition of a new physical port 115 and others to the IP network 104, whether the thus added physical port is provided with IPSec, whether the storage system 102 is increased in capacity, and the like.

Until receiving a volume creation request from the server 101, for example, the management server 103 keeps checking whether the IP network 104 is connected with any new physical port 115 and others. This check is not necessarily done all of the time, and it may be done at regular intervals, or at an arbitrary time. Specifically, the management server 103 may be notified of any addition of a new physical port manually by the system manager, or the management server 103 may regularly collect structure information about any device connected to the IP network 104 over the control network 105.

To regularly collect the structure information about any device connected to the IP network 104, the management server 103 may collect MIB (Management Information Base) from the device connected to the IP network 104 using SNMP (Simple Network Management Protocol). Alternatively, if an iSNS (Internet Storage Name Service) server is connected to the control network 105, the management server 103 may detect an SCN (State Change Notification) issued by the iSNS server over the control network 105. Here, iSNS is a known technique defined by the "Internet Storage Name Service" being the Internet draft, and therewith, the IP-SAN devices and FC-SAN devices can be found, identified, and managed (for reference, <URL: http://www.ietf.org/internet-drafts/draft-ietf-ips-isns-21.txt>) (Step 801).

If detecting any addition of a new physical port to the IP network 104, the management server 103 collects information about whether the newly-added physical port is provided with IPSec, as well as the node ID and the node type of the device including the physical port. Then, the management server 103 registers the thus collected information with the port attribute table 134. Such information may be collected through the system manager's manual input to the management server 103, or the management server 103 may automatically collect such information using MIB and others from the device including the thus newly added physical port (Step 802).

Thereafter, the management server 103 assigns an IP address and an object ID to the thus added physical port. Note here that the object ID is not necessarily assigned in this step. If not assigned in this step, the object ID is assigned to the physical port in the volume creation/assignment process to be executed by the management server 103 and the storage system 102. The IP address may be assigned through the system manager's manual input to the management server 103, or the management server 103 may automatically assign the IP address using a program such as a DHCP (Dynamic Host Configuration Protocol).

The object ID may be assigned through the system manager's manual input to the management server 103, or the device including the newly-added physical port may automatically assign the object ID to the port. For detection of the thus assigned IP address and the object ID, the management server 103 uses a notice provided by the system manager or information such as MIB. The detection result is registered with the port attribute table 134. If no object ID is assigned, the field 202 in FIG. 2 becomes blank in the storage system 102 having a node ID of "Storage 2" and the physical port with the IP address of 10.10.10.204 (Step 803).

Then, based on the information collected in Step 802, the management server 103 determines whether or not the added physical port is provided with IPSec, specifically, whether the HBA or others including the added physical port is provided with an IPSec processing unit (Step 804).

When the added physical port is provided with IPSec, the management server 103 makes a setting of an authentication ID and a password to be used by the added physical port at the time of IKE authentication. That is, the management server 103 provides the system manager with a notice about setting of an authentication ID and a password. The system manager then accordingly inputs information of an authentication ID and a password for the new physical port over an input interface of the management server 103. The management server 103 then registers the thus input authentication ID and password with the port attribute table 134 (Step 805).

If no new physical port is found in Step 801, if the physical port newly added in Step 804 is not provided with IPSec, or after Step 805 is through, the management server 103 detects whether the storage system 102 connected to the IP network shows any change in storage capacity and whether the device including the new physical port is the storage system 102. Such detections are done similarly to the case of connection detection of a physical port to the IP network 104, i.e., the system manager's manual setting, or regular collection of structure information using MIB and others (Step 806).

If any addition of the storage system 102 or any storage capacity change of the existing storage device 102 is detected, the management server 103 accordingly registers the storage capacity of the newly-added storage system 102 (or the storage system 102 showing some changes) with the storage capacity management table 135. The management server 103 may collect the storage capacity information of the storage system 102, similar to the case of physical port detection (Step 807).

If no addition of the storage system 102 or no capacity change of the storage system 102 is detected in Step 806, or after Step 807 is through, the management server 103 detects whether any physical port is deleted from the network 104, more specifically, whether any physical port is removed from the network 104. Such a detection may be done by detecting the IP address of the deleted physical port using the system manager's notice or regularly-collected information, such as MIB (Step 808).

Once the IP address of the physical port deleted from the network 104 has been detected, the management server 103 specifies information about the deleted physical port through search of the field 203 of the port attribute table 134. Then, the thus specified information is deleted from the port attribute table 134 (Step 809).

Figure 9:
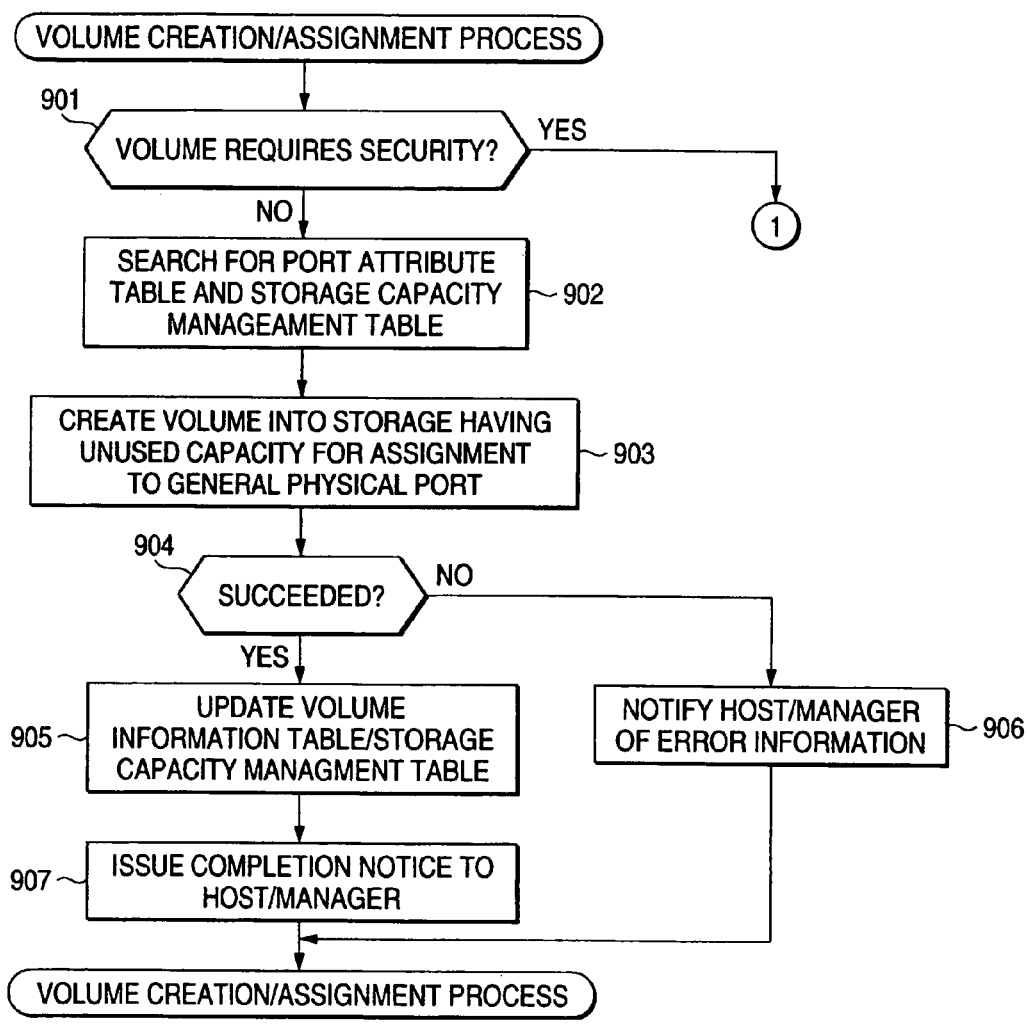
FIG. 9 is a flow diagram showing an exemplary procedure for a volume creation/assignment process.
Figure 10:
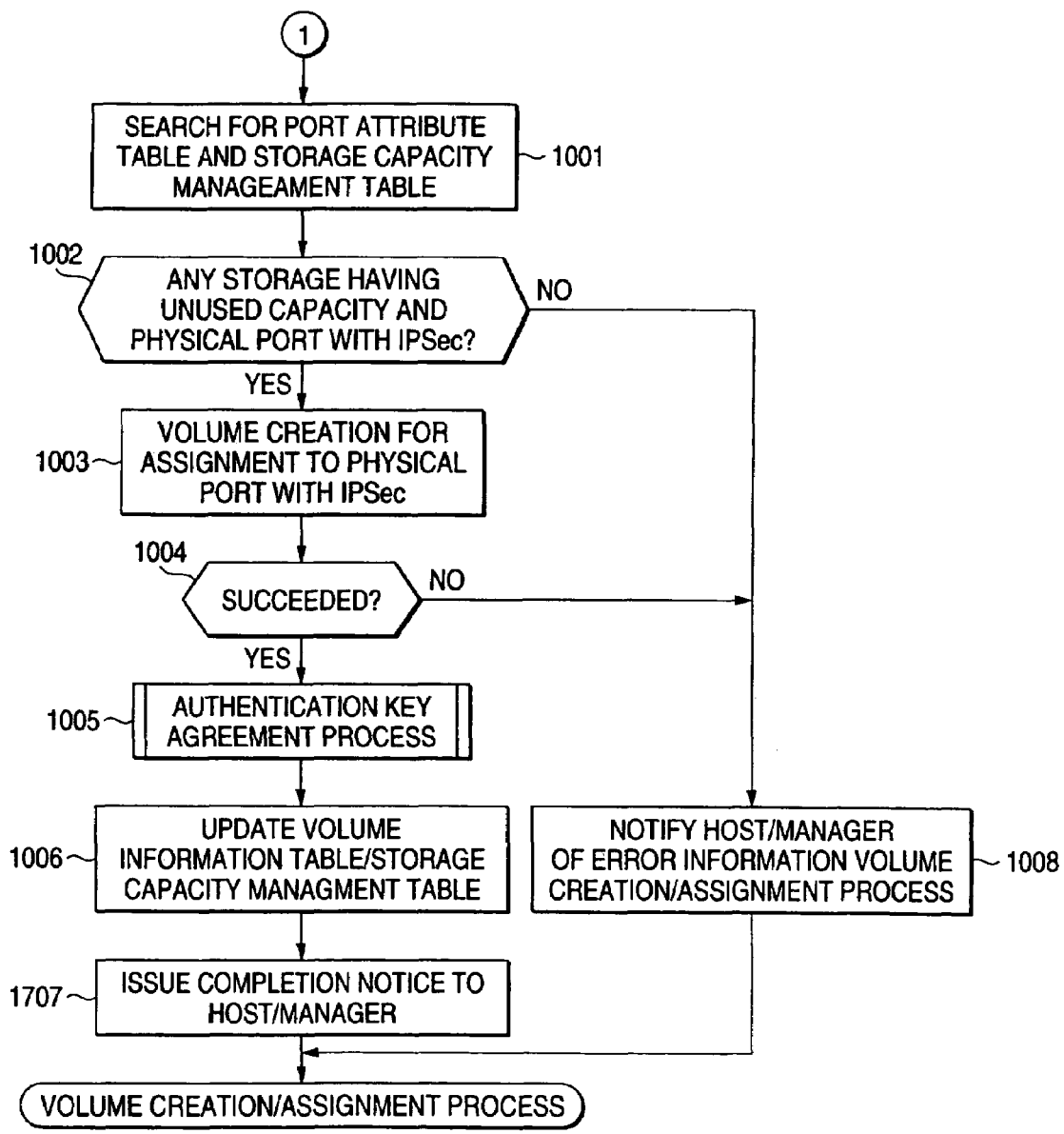
FIG. 10 is a flow diagram showing the exemplary procedure for the volume creation/assignment process.

FIGS. 9 and 10 both show the volume creation/assignment process to be executed by the management server 103 and the storage system 102. The volume creation/assignment process is executed in response to a volume creation request coming from the server 101 or the manager. The volume creation request includes information about the storage capacity required for a volume to be created, and the access security level for the volume, e.g., whether or not accessing the volume requires encryption using IPSec.

Based on the information about the access security level for the volume included in the volume creation request, the management server 103 first determines whether accessing the volume requires encrypted transfer using IPSec (Step 901).

If it is determined in Step 901 as not being necessary, the management server 103 specifies any physical port provided with no IPSec through search of the field 205 of the port attribute table 134. The management server 103 then specifies the IP address of the thus specified physical port and the node ID of the storage system 102 including the physical port. Next, the management server 103 makes a search of the storage capacity management table 135 using the thus specified node ID, and then it checks the unused capacity of the storage system 102 having the specified node ID. From the storage systems 102 having the specified node ID, the management server 103 then specifies the storage system 102 having an unused capacity equal to or more than the storage capacity of the volume requested for creation (Step 902).

To the storage system 102 specified in Step 902, the management server 103 then issues a command for volume creation with the storage capacity requested by the server or the system manager.

After receiving the command for volume creation, the storage system 102 starts creating a volume having the requested storage capacity. After completion of volume creation, the storage system 102 forwards a completion notice to the management server 103.

Upon reception of the completion notice, the management server 103 issues a command to the storage system 102 having which is through with volume creation. The command is the one instructing the storage system 102 to assign the thus created volume to a physical port without IPSec. This command includes information that is collected by the management server 103 in Step 902 about the IP address assigned to the physical port without IPSec in the specified storage system 102.

In response to such a port assignment command provided by the management server 103, the storage system 102 assigns the created volume to the specified physical port.

The storage system 102 then determines a TCP port number for establishing a TCP connection to the created volume. The storage system 102 may automatically determine the TCP port number, or the server 101 or the manager who has issued the volume creation request may be encouraged to determine the TCP port number. Alternatively, before the management server 103 issues a port assignment command, the management server 103 may automatically determine the TCP port number, or encourage the server 101 or the system manager who has issued the volume creation request to determine the TCP port number. And, the thus determined TCP port number may be included in the port assignment command. After completion of the assignment, the storage system 102 notifies the management server 103 of the result (Step 903).

In the above-described example, the management server 103 separately issues the volume creation command and the port assignment command. In an alternate manner, these commands may be issued as one command. The operation procedure in Step 903 in such a structure will be described below.

The management server 103 issues a volume creation/port assignment command to the storage system 102 specified in Step 902. This command is for volume creation with the storage capacity requested by the server or the manager, and is used for assigning the created volume to a physical port 125 having no IPSec. This command includes the information that is collected by the management server 103 in Step 902 about the IP address assigned to the physical port without IPSec in the specified storage system 102. Further, the command may include the TCP port number for use at the time of establishing a TCP connection to the created volume.

After receiving the volume creation/port assignment command, the storage system 102 accordingly creates a volume having the requested storage capacity. If volume creation has failed, the storage system 102 issues error information with respect to the management server 103. If volume creation has been successful, the storage system 102 assigns the resulting volume to the designated physical port 125. After completion of such assignment, the storage system 102 notifies the management server 103 of the result.

If there is no such storage system 102 capable of volume creation as requested in Step 902, or if Step 903 is not completed due to failure of the storage system 102, for example, the management server 103 communicates the error information to the server 101 or the manager who has issued the volume creation request, and then the volume creation/assignment process is terminated (Step 906).

In the case where Steps 902 and 903 are successful, the management server 103 updates the contents of the storage capacity management table 135 and the volume information table 123. To be specific, in the storage capacity management table 135, the management server 103 decreases the capacity of the created volume from the unused capacity of the storage system 102 which has created the volume in Step 903, and from the used capacity thereof, increases the capacity of the created volume.

To the storage system 102 which has been through volume creation in Step 903, the management server 103 also issues a command for updating the volume information table 123. In response to this command, the storage system 102 adds an entry to the volume information table 123 to cover any required information about the volume created in Step 903.

In more detail, the information includes the physical volume number of a physical volume corresponding to the created volume, the LUN number assigned to the volume, the storage capacity of the volume, the IP address of the port assigned with the volume, the TCP port number to be used to establish the TCP connection to the volume, the object ID assigned to the volume, and whether or not the port assigned with the volume is provided with IPSec.

Note here that, as the physical port 125 having been assigned the IP address of 10.10.10.204 in the storage system 102 with the node ID of "Storage2" of the FIG. 2 example, there are some physical ports 125 which have been assigned with no object ID. In the case of applying volume assignment to such physical ports 125, object ID assignment is performed in the following manner. That is, the management server 103 encourages the system manager to input an object ID, and the system manager responsively manually inputs the object ID to the management server 103. Then, the management server 103 instructs the storage system 102 to update the volume information table 123 with the object ID. In an alternate manner, any device including a physical port which has been assigned a volume may automatically assign an object ID to the physical port (Step 905).

After Step 905 is complete, the management server 103 issues a volume creation completion notice to the server 101 or to the system manager who has issued the volume creation request. The volume creation completion notice includes information about access paths to the created volume, i.e., the IP address and the TCP port number of the physical port which has been assigned with the created volume, and the LUN and the object ID assigned to the volume (Step 907).

On the other hand, if it is determined in Step 901 that the volume requires encrypted transfer using IPSec, the management server 103 makes a search of the field 205 of the port attribute table 134 to specify which physical port is provided with IPSec. Then, the management server 103 specifies the node ID of the storage system 102 having the IP address of the specified physical port and the physical port itself. Then, the management server 103 makes a search of the storage capacity management table 135 using the specified node ID to check the unused capacity of the storage system 102 having thus specified the node ID. From the storage systems 102 having the specified node ID, if plural, the management server 103 specifies the storage system 102 having the unused capacity equal to or more than the storage capacity of the volume requested for creation (Steps 1001 and 1002 of FIG. 10).

To the storage system 102 specified in Step 1002, the management server 103 issues a command for creating a volume with the storage capacity requested by the server or the system manager.

After receiving the command, the storage system 102 goes through volume creation with the requested storage capacity. After completion of volume creation, the storage system 102 forwards a notice indicating completion of volume creation to the management server 103.

Upon reception of the notice, to the storage system 102 which has created the volume, the management server 103 issues a command for assigning the created volume to the physical port with IPSec. This command includes information that is collected by the management server 103 in Step 1002 about the IP address assigned to the physical port with IPSec located in the specified storage system 102.

In response to the port assignment command provided by the management server 103, the storage system 102 accordingly assigns the created volume to the designated physical port. After such assignment, the storage system 102 notifies the management server 103 of the result (Step 1003).

In the above example, the management server 103 separately issues the volume creation command and the port assignment command. In an alternate manner, these commands may be issued as one command. The operation procedure in Step 1003 in such a structure will be described below.

The management server 103 issues a volume creation/port assignment command to the storage system 102 specified in Step 1002. This command is also for volume creation with the storage capacity requested by the server or the manager, and for assigning the created volume to a physical port having IPSec. This command includes information that is collected by the management server 103 in Step 1002 about the IP address assigned to the physical port with IPSec located in the specified storage system 102.

After receiving the volume creation/port assignment command, the storage system 102 accordingly creates a volume of the requested storage capacity. If volume creation has failed, the storage system 102 issues error information with respect to the management server 103.

If volume creation has succeeded, the storage system 102 assigns the resulting volume to the designated physical port. After completion of such assignment, the storage system 102 notifies the management server 103 of the result.

If no such storage system 102 capable of volume creation as requested in Step 1002 is found on the system, if no physical port is provided with IPSec, or if Step 1003 is not completed due to failure of the storage system 102, for example, the management server 103 sends error information to the server 101 or to the system manager who has issued the volume creation request, and then the volume creation/assignment process is terminated (Step 1008).

In the case where Steps 1002 and 1003 are successfully completed, the management server 103 executes an authentication key agreement process to register a password to be used for IKE authentication with the device using the IPSec. The authentication key agreement process will be described in detail later with reference to FIG. 11.

After the authentication key agreement process has been completed, the management server 103 updates the contents of the storage capacity management table 135 and the volume information table 123. To be more specific, in the storage capacity management table 135, the management server 103 decreases the capacity of the created volume from the unused capacity of the storage system 102 that has been created the volume in Step 1003, and from the used capacity thereof, increases the capacity of the created volume.

To the storage system 102 that has been through volume creation in Step 1003, the management server 103 also issues a command for updating the volume information table 123. Responding to the command, the storage system 102 adds an entry to the volume information table 123 to cover any required information about the volume created in Step 1003. In more detail, the information includes the physical volume number of a physical volume corresponding to the created volume, the LUN number assigned to the volume, the storage capacity of the volume, the object ID assigned to the volume, and whether or not the port assigned to the volume is provided with IPSec (Step 1006).

After Step 1006 or 1008 has been completed, the management server 103 issues a volume creation completion notice to the server 101 or the system manager who has issued the volume creation request. This is the end of the volume creation/assignment process with the requested volume.

Here, after receiving the volume creation completion notice, the server 101 provides the created volume with a device name for the purpose of handling the volume as a disk device. The OS operating on the server 101 may automatically provide a device name, or the user of the server 101 may manually determine it. Thereafter, the server 101 adds the disk path management table 111 with the device name provided to the volume, and path information for accessing the volume included in the volume creation completion notice, i.e., the object ID and LUN assigned to the volume, and the IP address and the TCP port number of the port that has been assigned with the volume.

A case is considered here in which the volume creation request coming from the server 101 or others may not include information about the security level (necessity for encryption). If this is the case, the management server 103 determines whether the server 101 having that has the volume creation request includes a physical port 115a with IPSec. This is for determining the security level requested potentially by the server 101. To be more specific, the management server 103 makes a search of the port attribute table 134 based on the IP address of the server 101 that has issued the volume creation request so as to specify whether the server 101 has the physical port 115a with IPSec.

In the case where the server 101 that has issued the volume creation request has the physical port 115a with IPSec, the management server 103 determines that accessing the created volume requires security protection. Thus, the management server 103 instructs the storage system 102 to assign the physical port with IPSec to the created volume. On the other hand, in the case where the server 101 that has issued the volume creation request has no physical port 115a with IPSec, the management server 103 determines that accessing the created volume does not require security protection. Therefore, the management server 103 instructs the storage system 102 to assign a physical port 115b without IPSec to the created volume.

Figure 11:
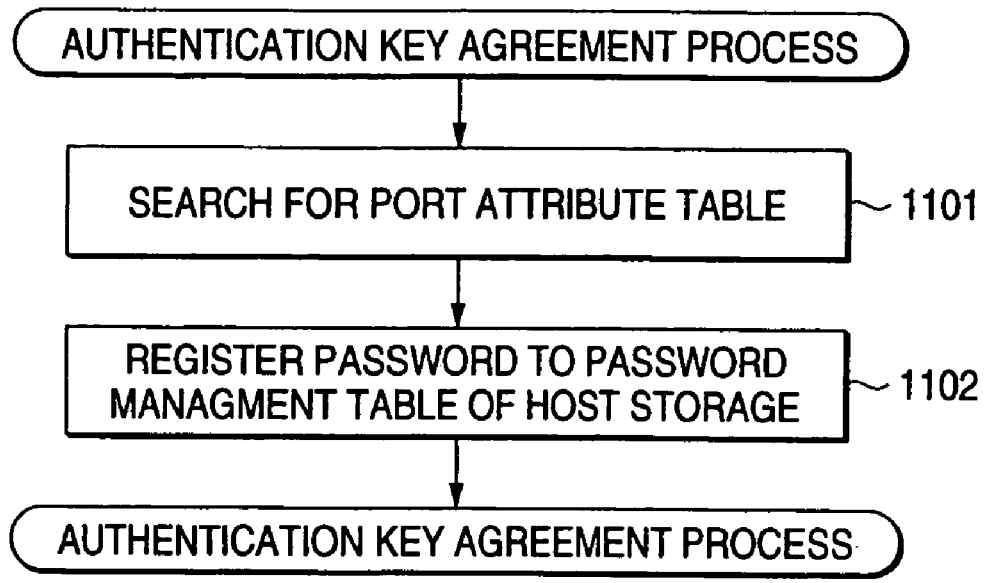
FIG. 11 is a flow diagram showing an exemplary procedure for an authentication key agreement process.

FIG. 11 is a diagram showing the detailed procedure of the authentication key agreement process to be executed by the management server 103.

In Step 702 of the volume assignment process, when the server 101 issues a volume creation request, the management server 103 that started the authentication key agreement process makes a search of the port attribute table 134 to specify the authentication IDs and the passwords of the physical ports 115 and 125. Herein, the physical port 115 is the one located in the server 101 that issued the volume creation request, and the physical port 125 is the one assigned with the volume in Step 903 or 1003. In this example, the management server 103 searches the port attribute table 134 for those authentication IDs and passwords based on the IP addresses assigned to the physical ports.

Moreover, in Step 702 of the volume assignment process, if the manager issues a volume creation request, the management server 103 that started the authentication key agreement process issues a command for the manager to designate the server 101 for permitting access to the created volume. In response to such information provided by the manager about which server 101 is permitted access, i.e., the node ID of the server 101 is permitted access, the management server 103 specifies the authentication IDs and the passwords of the physical port 115 located in the server 101 and the physical port assigned with the volume in Step 903 or 1003 through search of the port attribute table 134.

Herein, the management server 103 searches the port attribute table 122 for the authentication ID and the password of the physical port 115a located in the server 101 which is supposed to be permitted access (in the below, "access-permitted server 101") based on the node ID of the access-permitted server 101. The management server 103 also searches the port attribute table 122 for the authentication ID and the password of the physical port 125a that has been assigned with the volume based on the IP address assigned thereto (Step 1101).

After specifying the authentication IDs and the passwords for various physical ports, the management server 103 forwards a command to the storage system 102. Herein, the command is for registering, in the password management table of the storage system 102, the authentication ID and the password selected from those specified in Step 1101 for use with the physical port 115 of the server 101. Also forwarded is another command for registering, in the password management table of the server 101, the authentication ID and the password from those specified for use with the physical port 125a of the storage system 102.

In the above-described example, when the server 101 and others are not asking for the high security level, the management server 103 so applies control that the created volume is assigned to any physical port having no IPSec. This is not restrictive, and even if the server 101 and others are not asking for the high security level, the management server 103 may so apply control that the created volume is assigned to any physical port with IPSec. Although this will secure more security than necessary, this enables volume assignment even if the storage system having some unused capacity has only physical ports with IPSec.

In the first embodiment described above, when the management server 103 notifies the server 101 of volume creation, the path information to the storage system 102 that has completed volume creation is forwarded theretogether. This excludes other servers 101 from acquiring information needed for accessing the created volume. As a result, the created volume is available only for the server 101 that has been notified of volume creation.

Further, with iSCSI, a process (discovery) is defined for the server to find any object (target) included in any arbitrary storage system 102, i.e., to acquire path information. In this manner, with iSCSI, a plurality of servers 101 can share the path information about volume access. Thus, as a second embodiment, a case will now be considered in which such a discovery process is executed in a cooperative manner with the volume assignment process in the management server 103 of the first embodiment.

Here, discovery denotes the operation of an SCSI initiator executed to acquire information needed to log in an SCSI target through inquiry for a computer in charge of a name assigned to the SCSI target. Such a computer is referred as a "name service server" below. As a name service protocol corresponding to the iSCSI, exemplified are iSNS and SLP (Service Location Protocol) that is defined by "Finding iSCSI Targets and Name Servers Using SLP" being the Internet draft (for reference: <URL: http://www.ietf.org/internet-drafts/draft-ietf-ips-iscsi-slp-0.6.txt>).

Figure 12:
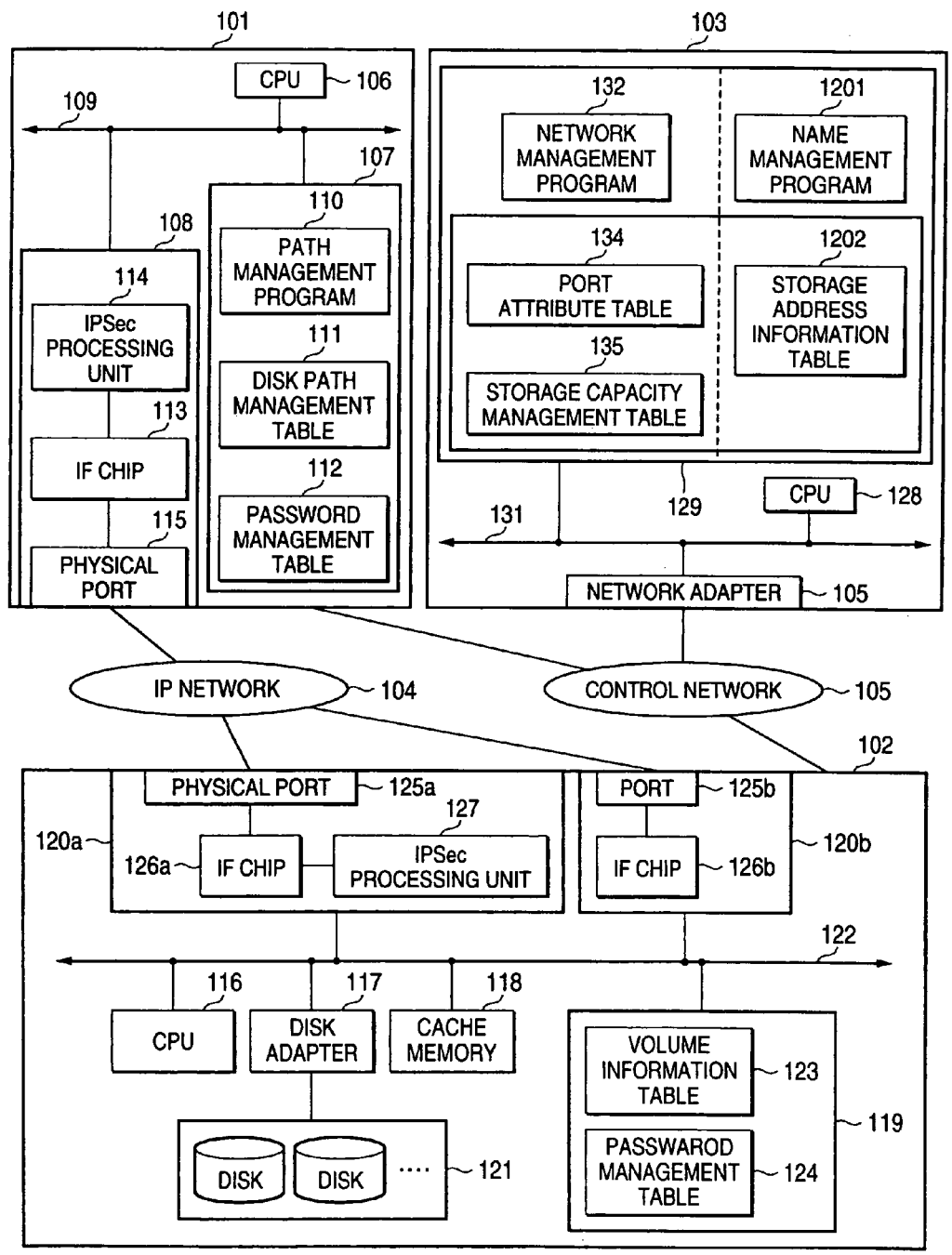
FIG. 12 is a block diagram showing an exemplary system structure of a second embodiment.

FIG. 12 is a diagram showing an example of the system structure of the second embodiment. In the following description, only differences from the first embodiment will be considered. In this second embodiment, the main difference from the first embodiment is that the management server 103 includes a name service server in addition to the management server 103. Note that, in the following description, any component identical to that of the first embodiment is provided with the same reference numeral.

The management server 103 is a general computer similar to the first embodiment, and includes a processor, memory, and a network adapter. The memory stores the network management program 132, a name service program 1201, and the network configuration database 133.

The network configuration database 133 is provided with the port attribute table 134, the storage capacity management table 135, and a storage address information table 1202.

By executing the network management program 132 in addition to the processes in the first embodiment, after volume creation, the management server 103 registers, in its own storage address information table 1202, the access path to the created volume and the object ID of the server 101 accessible to the volume. Here, the access path means information needed for volume access. In this manner, the management server 103 can provide a plurality of servers 101 with access path information about any specific one volume.

By executing also the name service program 1201, the management server 103 specifies information needed to log in the SCSI target. Such a specification is made based on the storage address information table 1202 with respect to a discovery request of the SCSI target that is received from the server 101 connected to the IP network 104. Then, the management server 103 forwards the thus specified information to the server 101 from which the discovery request came.

In the case of using an iSNS as the name service program 1201, the management server 103 notifies the server 101 of the object ID, the IP address, and the TCP port number of the SCSI target requested by the discovery request. In the exemplary structure of FIG. 12, the name service program 1201 and the storage address information table 1202 are both stored in the memory 129 of the management server 103. In an alternative structure, those programs may be operated not by the management server 103, but by another computer.

FIG. 13 is a diagram showing an exemplary structure of the storage address information table 1202, which takes charge of managing information needed for the server 101 connected to the network 104 to access an SCSI target located in the storage system 102 that is also connected to the network 104. This storage address information table 1202 includes entries corresponding in number to the SCSI targets in the storage system 102 connected to the network 104.

Each entry has fields 1301 to 1304. Specifically, the field 1301 is registered with an object ID assigned to an SCSI target corresponding to the entry; the field 1302 is registered with an IP address assigned to the SCSI target; the field 1303 is registered with a TCP port number corresponding to the IP address of the SCSI target; and the field 1304 is registered with an object ID assigned to the server 101 that is accessible to the corresponding SCSI target.

The field 1304 of any one specific entry stores as many object IDs as the number of servers 101 accessible to the SCSI target corresponding to the entry. Every time a volume is created, the management server 103 updates the storage address information table 1202.

Here, the information to be stored in the storage address information table 1202 has a dependency on a protocol to be used for name service. When the name service program 1201 takes charge of managing any other attributes, the storage address information table 1202 also stores information about those attributes.

Figure 14:
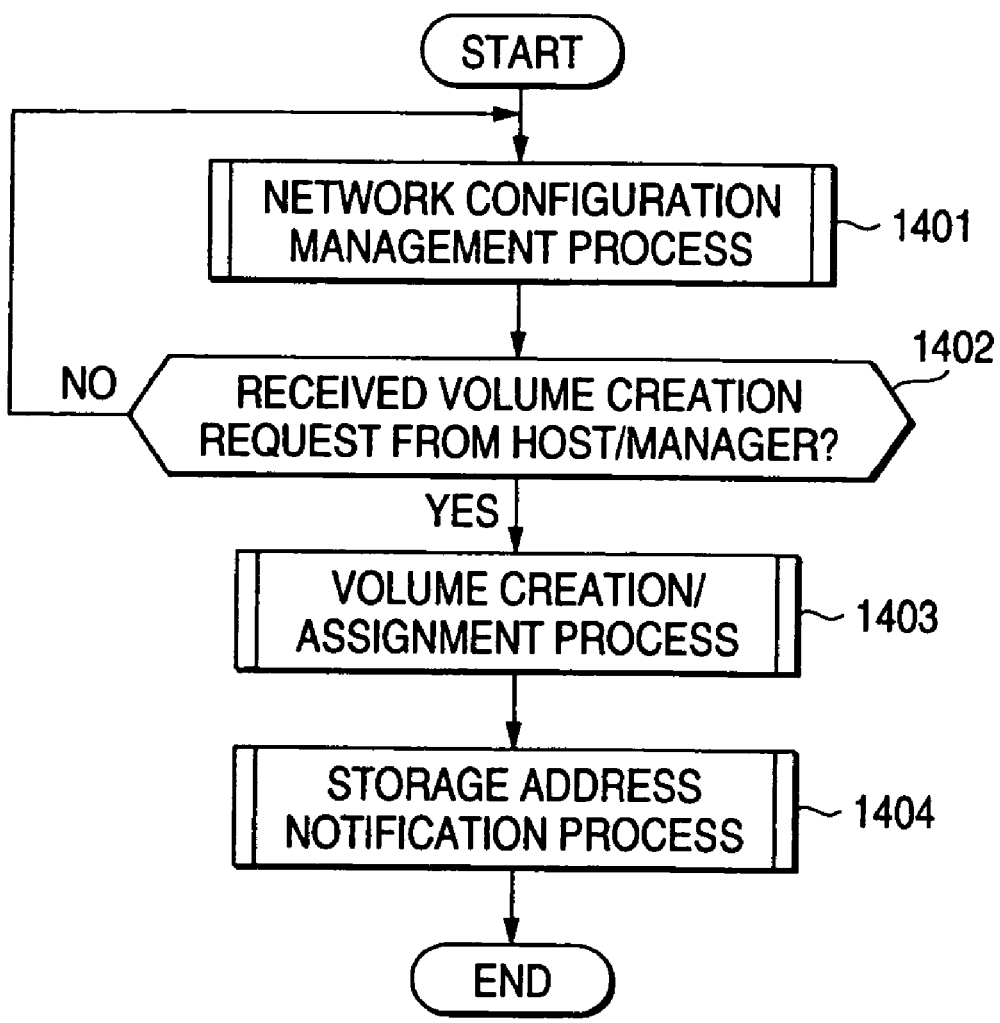
FIG. 14 is a flow diagram showing an exemplary overall procedure of a volume assignment process of the second embodiment.

FIG. 14 is a diagram showing an exemplary overall procedure of a volume assignment process of the second embodiment. Steps 1401 and 1402 are the same as Steps 701 and 702 of FIG. 8 in the first embodiment, and thus they will not be described again. After detecting a volume creation request from the server 101, the manager, or others in Step 1402, the management server 103 executes a volume creation/assignment process (Step 1403) and a storage address notification process (Step 1404). These processes will be described in detail later.

Figure 15:
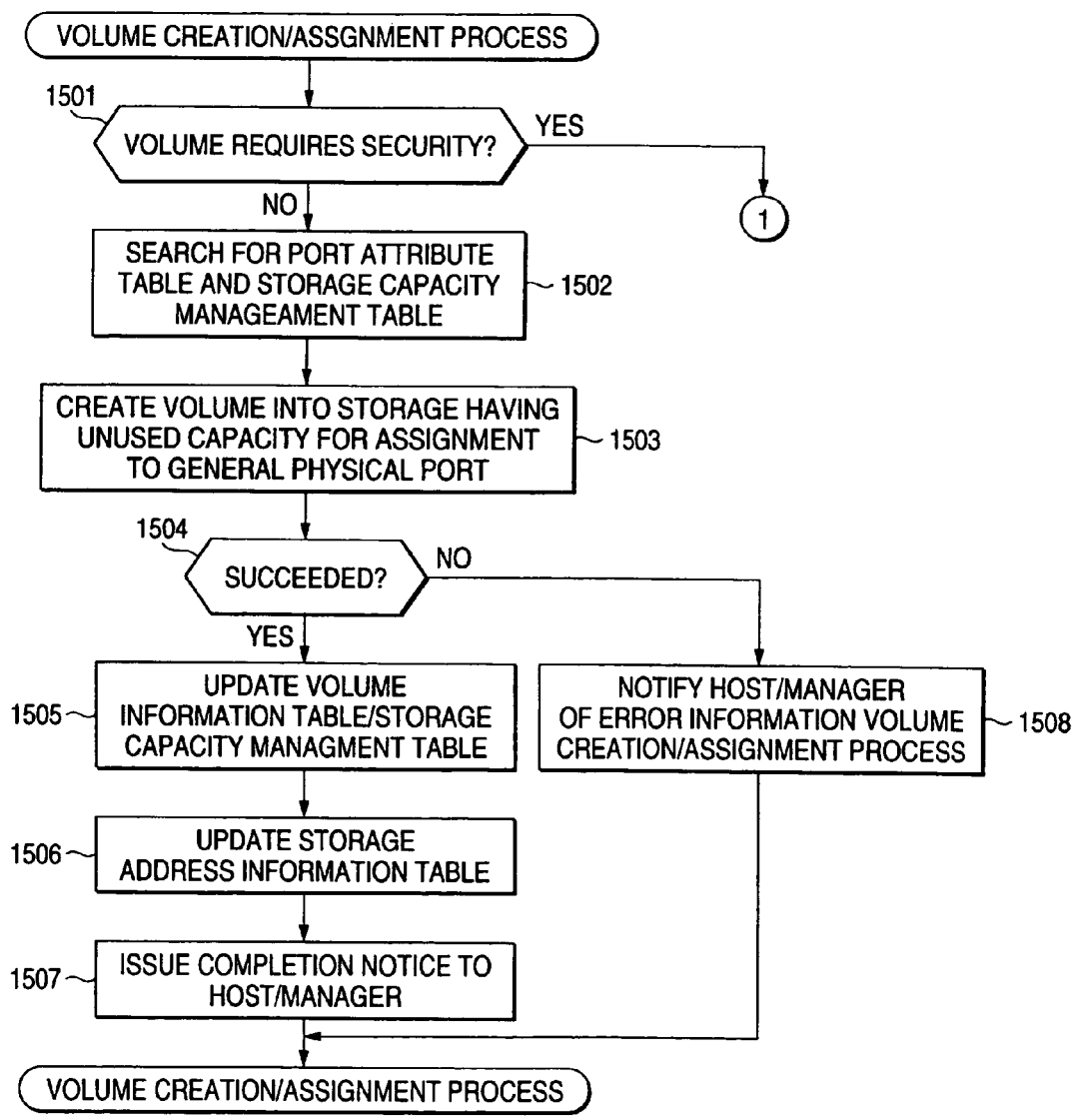
FIG. 15 is a flow diagram showing an exemplary procedure for a volume creation/assignment process of the second embodiment.
Figure 16:
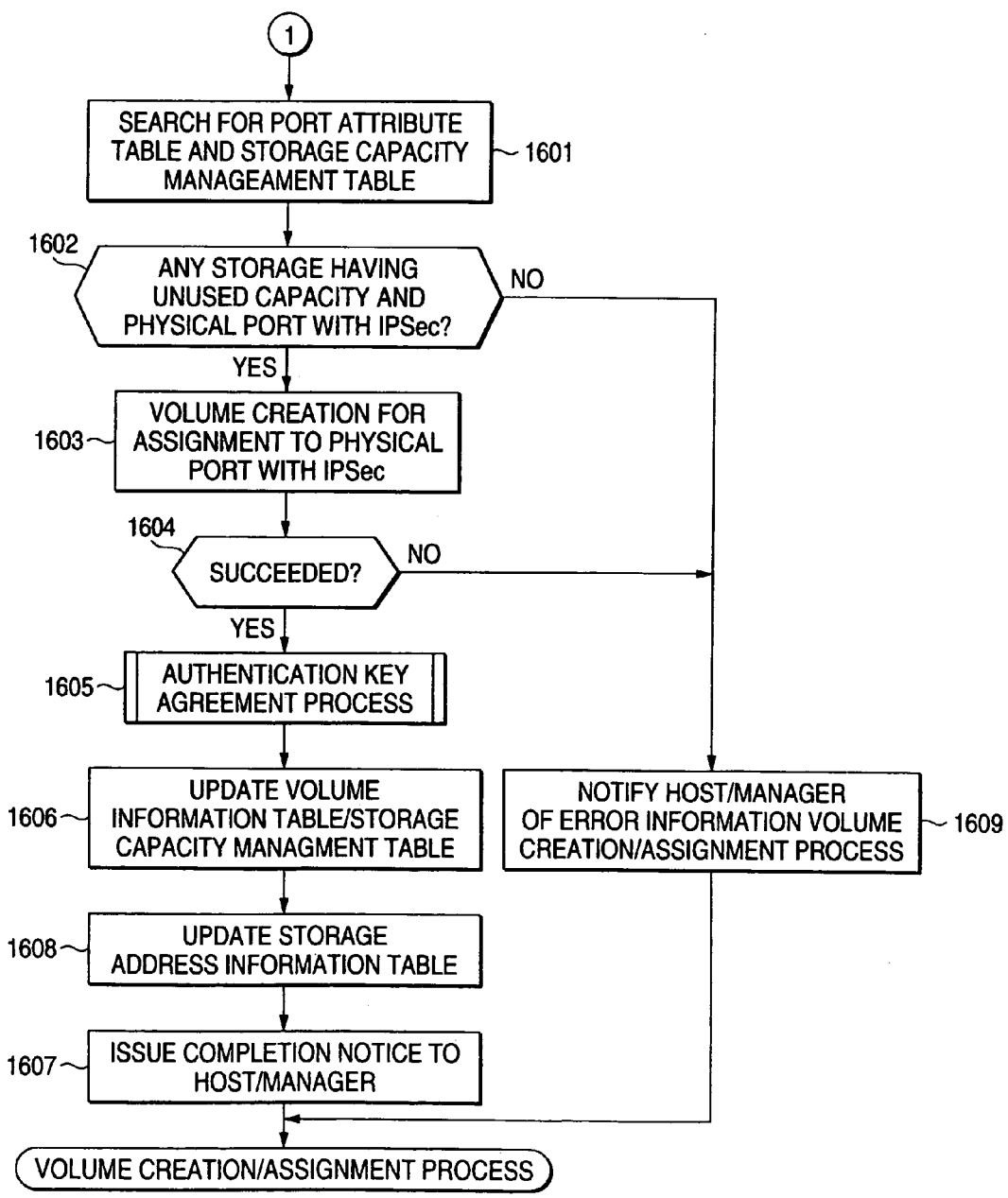
FIG. 16 is a flow diagram showing the exemplary procedure for the volume creation/assignment process of the second embodiment.

FIGS. 15 and 16 are both diagrams showing an exemplary procedure for the volume creation/assignment process (Step 1403 of FIG. 14) to be executed by the management server 103 and the storage system 102. Similar to the first embodiment, a volume creation request coming from the server 101 or the manager to the management server 103 includes information about the storage capacity required for a volume to be created, and the security level for the volume, e.g., whether accessing the volume requires encryption using IPSec or not. Here, similar to the first embodiment, the management server 103 may determine the security level depending on the property of the physical port of the server 101.

In FIG. 15, Steps 1501 to 1505 and 1508 are the same in process as Steps 901 to 906 in the volume creation/assignment process of FIG. 9 in the first embodiment, and thus they will not be described again. Further, in FIG. 16, Steps 1601 to 1606 and 1609 are the same in process as Steps 1001 to 1006 and 1008 in the volume creation/assignment process of FIG. 10 in the first embodiment, and thus they will not be described again.

In FIG. 15, after Step 1505 has been completed, the management server 103 registers, as a new entry with the storage address information table 1202, information included in the assignment request to the physical port issued with respect to the storage system 102 in Step 1503. The information herein includes the IP address, the TCP port number, and the object ID. Further, the management server 103 determines which server 101 is accessible to the volume created in Step 1503. The management server 103 then registers the object ID of the thus determined server 101 to the field 1304 of the entry that is newly added to the storage address information table 1202.

There are various ways to determine which server 101 is accessible to the newly-created volume. For example, if the volume creation request comes from the manager, the management server 103 may encourage the manager to register the server 101 that is accessible to the created volume. If the volume creation request comes from the server 101, the server 101 may be registered with the storage address information table 1202 by the management server 103 as the one accessible to the created volume. Alternatively, the servers 101 connected to the network 104 may be divided into a plurality of groups in advance, and the management server 103 may register every server 101 in the group (the server 101 having issued the volume creation request included) in the storage address information table 1202 as servers 101 that are accessible to the created volume (Step 1506).

Then, the management server 103 issues a volume creation completion notice (information about access paths is not included) to the server 101 or the manager who has issued the volume creation request. This is the end of the volume creation/assignment process for the case where the requested volume is not in need of an encrypted transfer.

In FIG. 16, after Step 1606 has been completed, the management server 103 registers, as a new entry with the storage address information table 1202, the IP address, the TCP port number, and the object ID included in the assignment request to the physical port that has been issued with respect to the storage system 102 in Step 1603.

The management server 103 determines which server 101 is accessible to the volume created in Step 1603. The management server 103 then adds the object ID of the thus determined server 101 to the field 1304 of the entry that has been newly added to the storage address information table 1202. The ways to determine the accessible server 101 are similar to those described with reference to FIG. 15 (Step 1607).

The management server 103 then issues a volume creation completion notice (information about access paths is not included) to the server 101 or the manager who has issued the volume creation request.

Figure 17:
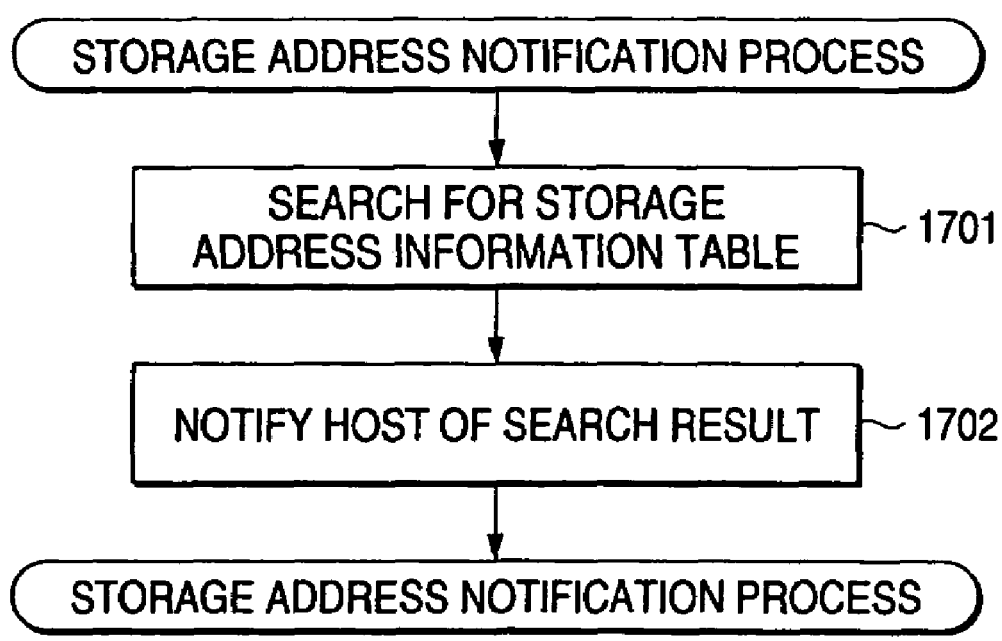
FIG. 17 is a flow diagram showing an exemplary procedure for a storage address notification process.

FIG. 17 is a diagram showing an example of the procedure for a storage address notification process to be executed in Step 1405 of FIG. 14. The management server 103 makes a search of the storage address information table 1202 to specify the object ID, the IP address, the TCP port number assigned to the volume created in Step 1403, and the server 101 accessible to the created volume (Step 1701).

Next, the management server 103 notifies the server 101 specified in Step 1701 of the object ID, the IP address, and the TCP port number specified also in Step 1701. As an exemplary way for such notification, the management server 103 operating as the iSNS server issues an SCN to the server 101 to request discovery to the server 101 connected to the network 104 (Step 1702).

Here, the server 101 connected to the network 104 handles the management server 103 as a name service server, and, in the present embodiment, as an iSNS server. Thus, the server 101 issues a discovery request to the management server 103 to receive information about making access to a target for its use.

Figure 18:
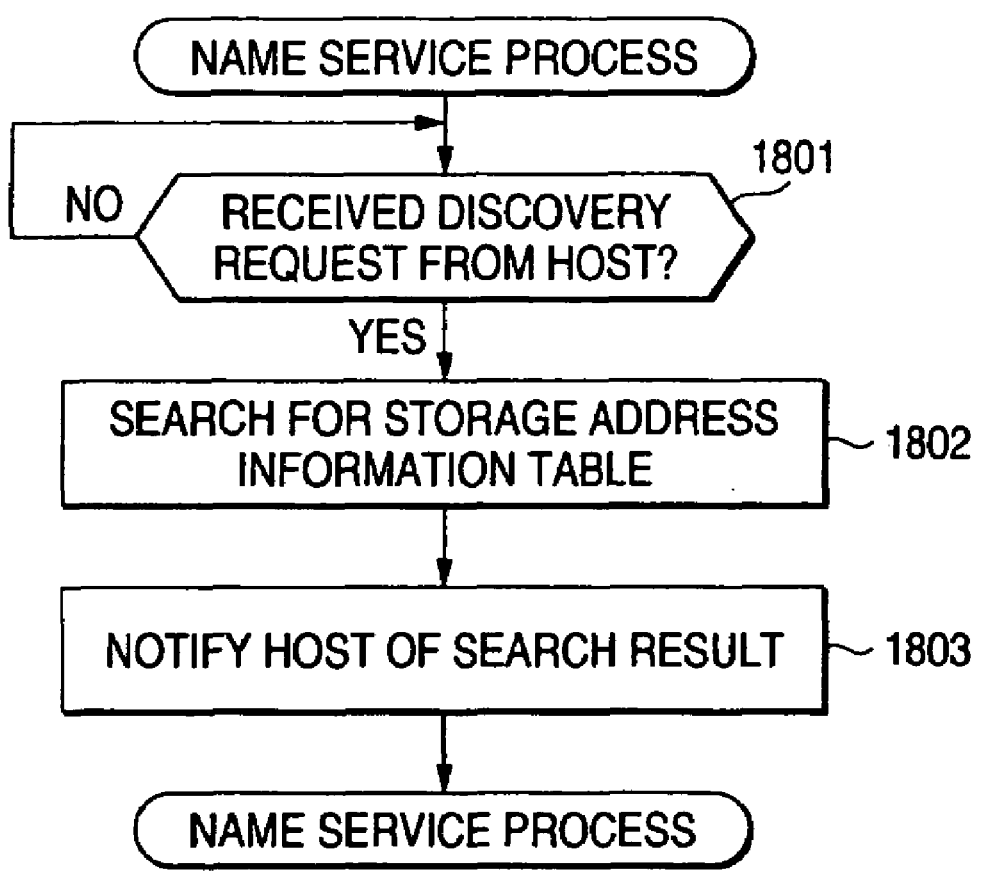
FIG. 18 is a flow diagram showing an exemplary procedure for a name service process.

FIG. 18 is a diagram showing an example of the procedure for a process to be executed when the management server 103 receives the discovery request. In the following description, such a process is referred to as a "name service process".

When the process based on the discovery request is not executed, the management server 103 monitors whether any discovery request comes from the server 101 (Step 1801).

After receiving the discovery request from the server 101, the management server 103 makes a search of the storage address information table 1202 to specify which SCSI target is accessible by the server 101 that has issued the discovery request. The management server 103 then acquires from the storage address information table 1202 the object ID, the IP address, and the TCP port number of the SCSI target accessible by the server 101 that has issued the discovery request (Step 1802).

The management server 103 then notifies the server 101 that has issued the discovery request of the object ID, the IP address, and the TCP port number acquired in Step 1802 (Step 1803).

According to the present embodiment, through management of the access path information about the volume located in the storage system 102, the management server 103 can perform volume provision to users in a more flexible manner.

In an exemplary modification of the structure of the second embodiment, the management server 103 and others assign a plurality of physical ports to the created volume, thereby providing a plurality of access paths to the created volume. This allows both types of physical port usable with IPSec and another unusable with IPSec to be assigned to a singly created volume. That is, the volume can be accessed by several different access paths.

Therefore, in response to a discovery request issued from the server 101, the management server 103 notifies the server 101 of every access path plurally available. When the server 101 that has issued the discovery request includes an HBA with IPSec, for example, any access path(s) using encryptable physical port (s) are identified. When the server 101 includes no HBA with IPSec, for example, notified are any access path(s) using unencryptable physical volume (s). Alternatively, in response to the discovery request issued by the server 101, every access path using physical ports with IPSec or every access path using physical ports without IPSec may be identified. Here, to determine whether or not the physical port of the server 101 is provided with IPSec, the management server 103 can check by reference to the port attribute table.

FIG. 19 is a diagram showing an exemplary structure of the volume information table 123 in the case where a volume is assigned with a plurality of ports. The volume information table 123 basically has the same structure as that of FIG. 5 except for some differences. That is, a field 1904 herein can plurally carry an IP address of the assigned port, and a field 1905 herein can carry an SCSI object of the assigned port and a TCP port number for use at the time of establishing a TPC connection both plurally. Further, correspondingly, a field for carrying information indicating whether the physical port denoted by the registered IP address has IPSec is provided plurally for a single object. In the FIG. 19 example, to a physical port Vol. 0, an IP address 10.10.10.201 of the physical port with IPSec is assigned, and an IP address 10.10.10.202 of the physical port without IPSec is assigned.

FIG. 20 is a diagram showing an example of the structure of the storage address information table 1202 in this modification. In this modification, unlike the storage address information table 1202 of FIG. 14, the storage address information table 1202 can register information about a plurality of access paths for a single SCSI target. For example, in FIG. 20, for an SCSI target whose object ID is iqn.2003-01.com.example:storage1, information is registered about the IP address 10.10.10.202 and a TCP port number 3260 of a port with IPSec, and the IP address 10.10.10.202 and the TCP port number 3260 of a port without IPSec.

In the volume assignment process in this modification, the volume creation/assignment process in Step 1403 and the storage address notification process in Step 1404 are executed in different order. Only this difference will be described below.

First, no determination is made in Step 1501 of the volume creation/assignment process, and the procedure goes to Step 1601. No difference is observed in Steps 1601 and 1602.

In Step 1603, the management server 103 issues a command to the storage system 102 for assigning the created volume to both the physical port with IPSec and another without IPSec. Here, the physical ports to be assigned with the created volume, designated by the management server 103, is arbitrary in number, and may be two or more.

In the authentication key agreement process in Step 1605, the management server 103 registers an authentication ID and a password of the physical port with IPSec assigned to the volume. This registration is done with the password management table 112 of the server 101 accessible to the created volume. If the physical port with IPSec assigned to the volume is plural in number, their authentication IDs and passwords are all registered with the password management table 112.

When the volume information table 123 is updated in Step 1605, the volume information table 123 is registered with the IP addresses and the TCP port numbers of every physical port assigned with the volume by the storage system 102 in Step 1603.

When the storage address information table 1202 is updated in Step 1608, the storage address information table 1202 is registered with the IP addresses and the TCP port numbers of every physical port assigned with the volume by the storage system 102 in Step 1603. Also registered is information about whether the physical ports are provided with IPSec.

In Step 1702 of the storage address notification process in Step 1405, the management server 103 asks for discovery of the server 101 that is accessible to the volume specified in Step 1701.

After receiving the discovery request from the server 101, the management server 103 makes a search of the storage address information table 1202 to specify which object is accessible by the server 101 that has sent the discovery request. Then, the management server 103 makes a search of the port attribute information 134 to check the property of the physical port located in the server 101 that has sent the discovery request. Herein, the property indicates whether the IPSec is provided or not. If the server 101 from which the discovery request came includes an HBA with IPSec, the management server 103 forwards, to the server 101, the IP address and the TCP port number of the physical port with IPSec out of those assigned to the specified object. On the other hand, when the server 101 has no HBA with IPSec, the management server 103 forwards the IP address and the TCP port number of the physical port without IPSec out of those assigned to the specified object to the server 101.

Figure 21:
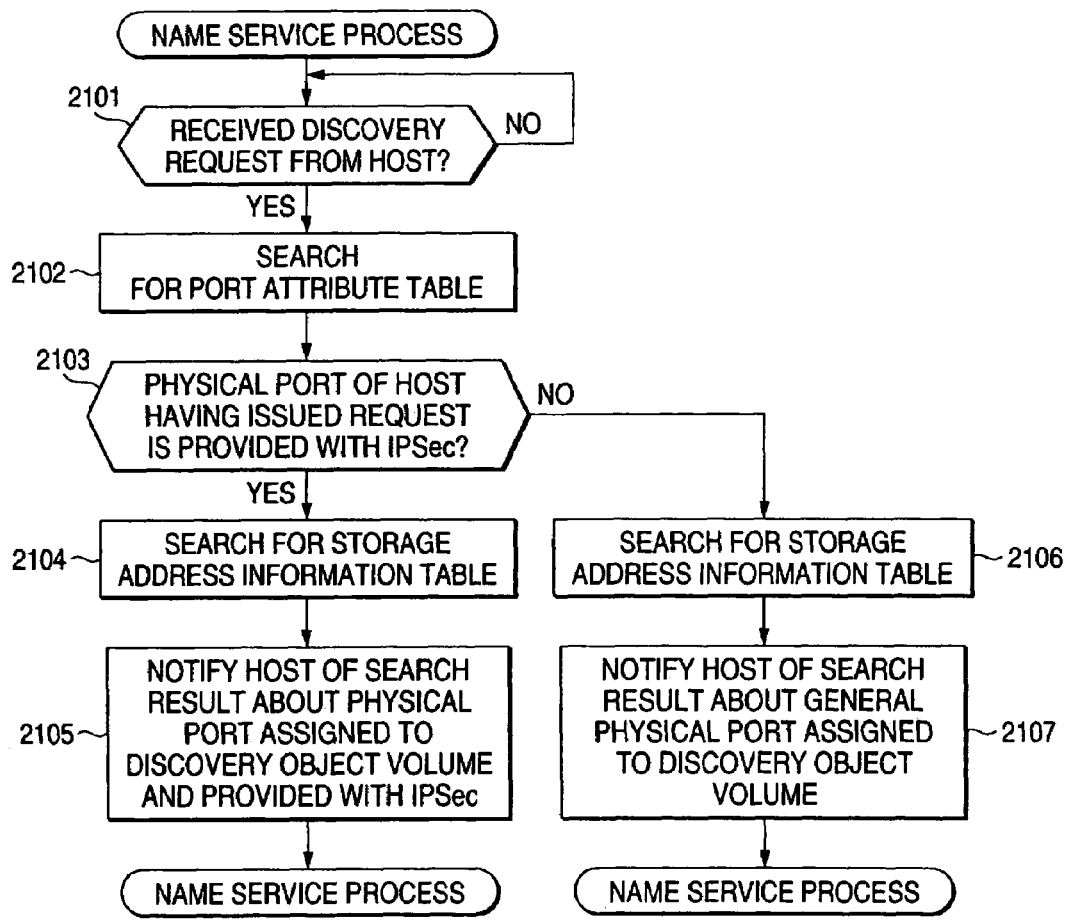
FIG. 21 is a flow diagram showing the exemplary procedure for the name service process.

FIG. 21 is a diagram showing an example of the procedure for the name service process to be executed by the management server 103 in this modification. When the process based on the discovery request is not executed, the management server 103 monitors whether any discovery request comes from the server 101 (Step 2101).

After receiving a discovery request from the server 101, the management server 103 makes a search of the port attribute table 134 based on information about the IP address of the server 101 included in the discovery request so that the node ID of the server 101 that has issued the discovery request is specified. The management server 103 then makes a search of the port attribute table 134 again, this time based on the thus specified node ID, to specify whether the server 101 that has issued the discovery request includes an HBA with IPSec (Steps 2102 and 2103).

In the case where the server 101 that has issued the discovery request, includes the HBA with IPSec, the management server 103 makes a search of the storage address information table 1202 to specify which SCSI target is accessible by the server 101 that has issued the discovery request. Then, the management server 103 also makes a search of the storage address information table 1202, this time to specify the object ID, the IP address, and the TCP port number of the physical port with IPSec out of those assigned to the specified SCSI target (Step 2104).

Then, the management server 103 notifies the server 101 that has issued the discovery request of the information specified in Step 2104, i.e., the object ID, the IP address, and the TCP port number of the specified physical port. The procedure then returns to Step 2101 (Step 2105).

On the other hand, in the case where the server 101 that has issued the discovery request is determined in Step 2103 as including no physical port with IPSec, the management server 103 makes a search of the storage address information table 1202 to specify which SCSI target is accessible by the server 101 that has issued the discovery request. Then, the management server 103 also makes a search of the storage address information table 1202, this time based on the specified SCSI target, to specify the object ID, the IP address, and the TCP port number of the physical port without IPSec out of those assigned to the specified SCSI target (Step 2106).

Then, the management server 103 notifies the server 101 that has issued the discovery request of the information specified in Step 2206, i.e., the object ID, the IP address, and the TCP port number of the specified physical port. The procedure then returns to Step 2101 (Step 2107).

As another exemplary modification of the structure of the second embodiment, the server 101 issuing a discovery request may also include therein a request for the security level (necessity for encryption). With such a structure, the server 101 becomes able to ask for a target meeting its requested security level from the management server 103.

Such a structure is enabled by using "Vendor Specific Attribute" and "Vendor Specific Message" provided for the iSNS protocol. Herein, the Vendor Specific Attribute denotes a bit string arbitrarily usable for providing any specific attribute to the iSNS server (management server 103 in the present embodiment) and the iSNS client (server 101 or storage system 102 in the present embodiment). The Vendor Specific Message is one embedding arbitrary information into packets to be exchanged between the iSNS server and the iSNS client.

The above-described "Vendor Specific Attribute" and "Vendor Specific Message" are specifically used as described below. That is, as the attribute information to be registered with the Vendor Specific Attribute, defined is "whether or not IPSec is provided". Specifically, such a definition is made that the bit string is set to a bit 1 for every port under the management of the iSNS server, i.e., for every IP address if the IPSec is usable. If the IPSec is not usable, the bit string is set to a bit 0. Also defined is "Vendor Specific Message" for exchanging such information as "necessity for encryption" and "whether or not IPSec is provided".

In the above definition, when the iSNS client registers its own address with the iSNS server, a "whether or not IPSec is provided" message embedded with information about whether IPSec is usable is forwarded to the iSNS server. This will enable the iSNS server to collect attribute information relating to "whether or not IPSec is provided" from the iSNS client. Then, when issuing a discovery request to the iSNS server, the iSNS client includes therein the "necessity of encryption" message embedded with whether encryption is needed for transmission to the iSNS server. In response to the discovery request, the iSNS server makes a search of the thus collected attribute information of the iSNS client. If the discovery request is asking for encryption, the iSNS client can notify only the storage system 102 with IPSec from those accessible by the iSNS client.

Figure 22:
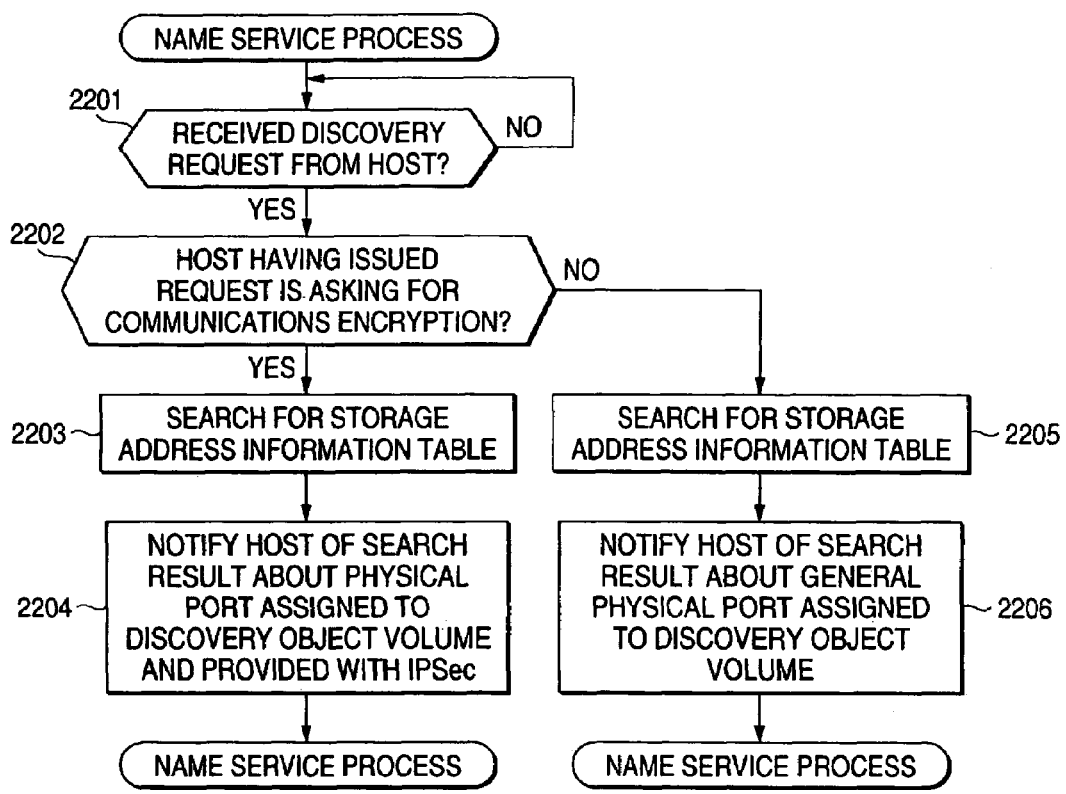
FIG. 22 is a flow diagram showing the exemplary procedure for the name service process.

FIG. 22 is a diagram showing an example of the procedure for the name service process in the case where server 101 issues a discovery request including the security level (necessity for encryption) in the above-described other modification. When the process based on the discovery request is not executed, the management server 103 monitors whether any discovery request comes from the server 101 (Step 2201).

After receiving a discovery request, the management server 103 makes a determination based on the information in the discovery request whether the server 101 that has issued the discovery request is requiring encryption (Step 2202).

If the server 101 that has issued the discovery request is determined to be requiring encryption, the management server 103 goes through the process similar to Steps 2104 and 2105 in the above-described modification (FIG. 21). To be more specific, the management server 103 forwards to the server 101 information about any SCSI target, including the physical port with IPSec, out of those accessible by the server 101 (Steps 2203 and 2204).

If the server 101 that has issued the discovery request is determined to be not requiring encryption, on the other hand, the management server 103 goes through the process similar to Steps 2106 and 2107 in the above-described modification (FIG. 21). To be more specific, the management server 103 forwards to the server 101 information about any SCSI target including the physical port without IPSec, out of those accessible by the server 101 (Steps 2205 and 2206).

In Step 2205, the management server 103 may skip the process for determining whether IPSec is provided, and to the server 101, it simply forwards information about the physical port assigned to the SCSI target that is accessible by the server 101. That is, when the server 101 is asking for the low security level, the management server 103 may notify the server of the information about a physical port having a higher security level among others of the SCSI target corresponding to the low security level.

Note here that, also in the first embodiment, similar to the second embodiment, the management server 103 can instruct the storage system 102 to assign a plurality of physical ports 125 to a single volume. If this is the case, at the time of notifying the server 101 of volume creation completion, the management server 103 also communicates information about the physical ports 125 that are assigned to the volume. After receiving such a notice, the server 101 responsively uses the thus notified physical ports 125 based on its own arbitrary requirement, e.g., one of the notified physical ports 125 is generally used, and the other may be used for a substitution path.

In such a case, the physical ports included in the information communicated to the server 101 may be those that are all high in security level, partially high in security level, or all low in security level. For example, if the server 101 is asking for the high security level, information may be sent including only physical ports with the high security level, or information including at least one physical port with the high security level.

In the second embodiment, upon reception of the discovery request, the management server 103 arbitrarily selects the physical port assigned to the volume accessible by the server 101, or selects depending on the type of the physical port of the server 101 or the security level requested by the server 101. The information about the thus selected physical port is forwarded to the server 101. The issue here is that, in such a manner as used in the second embodiment, the server 101 itself will find it difficult to change the security level as appropriate for volume access.

For improvement, in a third embodiment, a structure is considered in which the server 101 itself goes through physical port selection for volume access depending on the security level.

In detail, in such a structure, after receiving the discovery request from the server 101, the management server 103 forwards to the server 101 information about the object ID, the IP address, the TCP port number of every physical port assigned to the volume accessible by the server 101, and information as to whether IPSec is provided thereto.

Further, upon reception of such information, the server 101 stores the information into the disk path management table 111. The server 101 uses information about a plurality of paths for the volume stored in the disk path management table 111 as a basis to select any physical port with IPSec for access only when encryption using IPSec is required.

FIG. 23 is a diagram showing an example of the structure of the disk path management table 111 in the present embodiment. The disk path management table 111 in the present embodiment basically has the same structure as that of FIG. 4 in the first embodiment except for some differences. That is, herein, the device name may be assigned with a plurality of IP addresses, and a field 2306 is provided for registering information about whether or not IPSec is provided to the physical ports corresponding to these IP addresses.

For example, in FIG. 23, the device having the device name of /dev/hda is assigned with a port having the IP address of 10.10.10.201 and the TCP port number of 3260, and a port with the IP address of 10.10.10.202 and the TCP port number of 3260. Here, the port with the IP address of 10.10.10.201 and the TCP port number of 3260 is the physical port with IPSec, and the port with the IP address of 10.10.10.202 and the TCP port number of 3260 is the physical port without IPSec.

Figure 24:
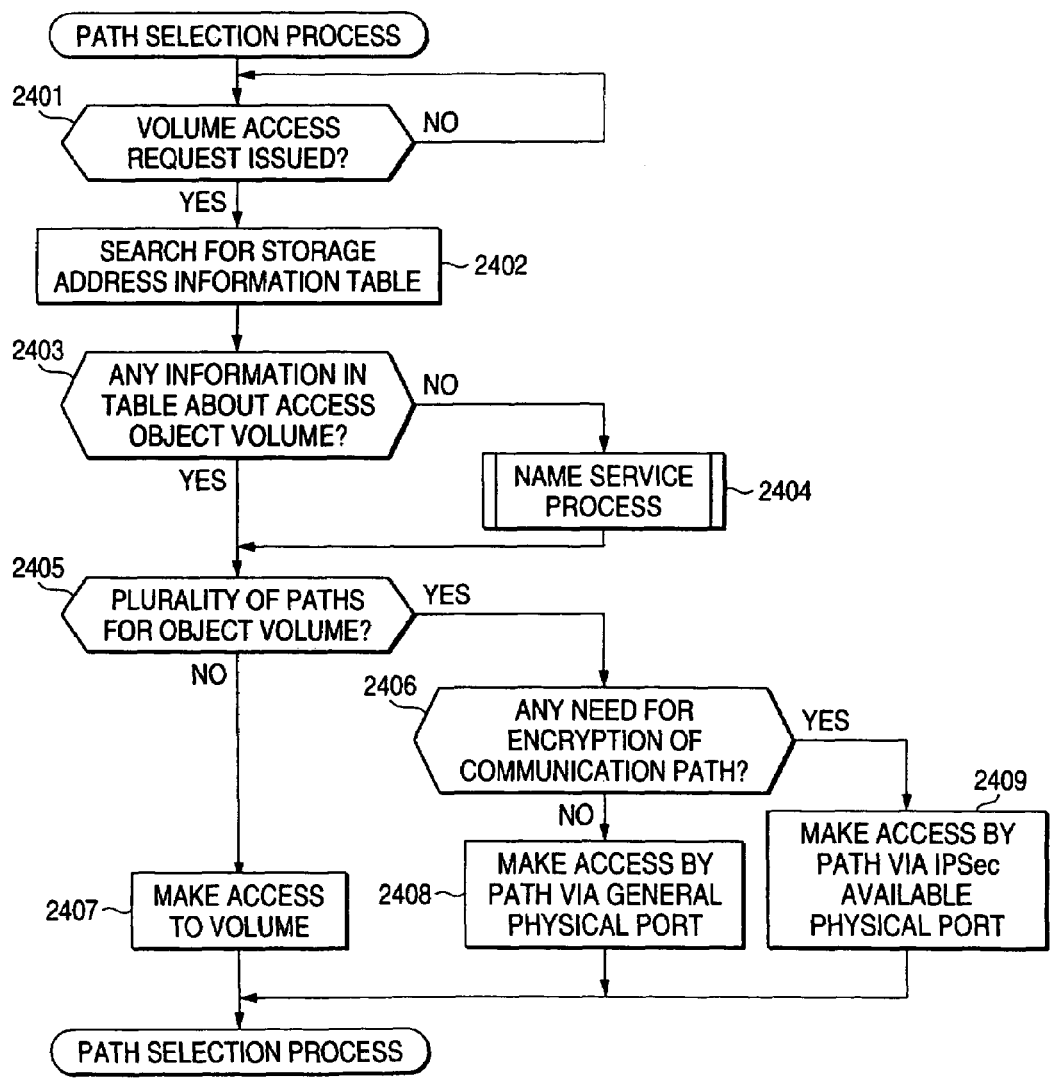
FIG. 24 is a flow diagram showing an exemplary procedure for a path selection process.

FIG. 24 is a diagram showing an example of the path selection process to be executed by the server 101 through execution of the path management program 110. When the volume access request requires encryption, the server 101 uses the communications path using IPSec, otherwise, the communications path not using IPSec is used.

First, in the program executed by the server 101, the server 101 determines whether or not a volume access request has been issued (Step 2401).

If issued, the server 101 makes a search of the disk path management table 1307 to check to see if there is any information about the volume requested for access (Steps 2402 and 2403).

If there is no such information about the volume requested for access, the server 101 issues a discovery request to the management server 103. The management server 103 that has received the discovery request executes the name service process similar to that of FIG. 22.

If there is information about the volume requested for access in Step 2403, or if the information about the volume requested for access is provided in Step 2404 by the management server 103, the server 101 determines whether or not an access path is plurally available for the volume requested for access (Step 2405).

If a plurality of access paths are available, the server 101 determines whether the program that has issued the volume access request is in need of encrypted transfer. For such a determination, for example, the program for volume access may include information about the necessity of encryption for the access request for the server 101 to detect, or the user of the server 101 may, in advance, make a setting of the necessity of encryption for every program, and a determination may be made in accordance with the setting (Step 2406).

If the program is in need of encrypted transfer, the server 101 selects the access path using the physical port with IPSec on the target side. Then, the server 101 uses the thus selected access path to carry out communications with the storage system 102 including the volume requested for access (Step 2409).

If the program is not in need of encrypted transfer, on the other hand, the server 101 selects the access path using the physical port without IPSec on the target side. Then, the server 101 uses the thus selected access path to carry out communications with the storage system 102, including the volume requested for access (Step 2408).

If it is determined that the access path is not plurally available in Step 2405, the server 101 carries out communications with the storage system 102 using the only access path available for the volume requested to be accessed.

Herein, the first embodiment also can achieve the same effects as the third embodiment. For this purpose, the server 101 receives information about a plurality of access paths together with a volume creation completion notice for registration with the disk path management table.

What we claim:

1. A computer system, comprising:
   a first computer;
   a plurality of storage systems coupled to the first computer over a network; and
   a second computer coupled to the first computer and the plurality of storage systems,
   wherein the first computer sends a request to the second computer,
   wherein the second computer has information about security level of the plurality of storage systems, selects, in response to the request from the first computer, one of the plurality of storage system according to the information in the second computer, and transmits a command to the selected one of the plurality of storage systems for creating a logical volume which is constructed on a physical disk device of the one of the plurality of storage systems for use by the first computer based on the request of the first computer,
   wherein the one of the plurality of storage systems creates the logical volume in accordance with the command, and forwards a creation completion notice to the second computer, and
   wherein after receiving the notice, the second computer notifies the first computer of path information of an access path from the first computer to the logical volume in the one of the Plurality of storage systems created by the one of the plurality of storage systems.

2. A computer system according to claim 1,
   wherein the request sent by the first computer to the second computer is a request for creating the logical volume with a high security level.

3. A computer system according to claim 2,
   wherein each of the plurality of storage systems has an interface device coupled to the network for communicating with the first computer via the network,
   wherein the information about the security level is information about whether or not the interface device in each of the storage systems can execute a ciphered communication with the first computer by using IPSec process, and wherein the high security level means the interface device in the corresponding storage system is capable of the ciphered communication by using IPSec process.

4. A computer system according to claim 3, wherein the second computer selects a first storage system, which has a first interface device that can execute a ciphered communication with the first computer by using IPSec process, of the plurality of storage systems if the request indicates to create a first logical volume with which the first computer can communicate with the high security level, and sends a first command to the first storage system, wherein the first command is a command for interrelating the first logical volume to be created to the first interface device capable of ciphered communication by using the IPSec process in the first storage system, wherein in accordance with the first command, the first storage system interrelates the created first logical volume to the first interface device capable of the ciphered communication by using the IPSec process, and wherein the second computer notifies the first computer of address information as the path information in the network assigned to the first interface device capable of the ciphered communication by using the IPSec process.

5. A computer system according to claim 3, wherein the second computer selects a first storage system, which has a first interface device and a second interface device each of which can execute a ciphered communication with the first computer by using IPSec process, of the plurality of storage systems if the request indicates to create a first logical volume with which the first computer can communicate with the high security level, and sends a first command to the first storage system, wherein the first command is a command for interrelating the first logical volume to the first and second interface devices capable of the ciphered communication by using the IPSec process in the first storage system, wherein in accordance with the first command, the first storage system interrelates the created first logical volume to the first and second interface device capable of the ciphered communication by using the IPSec process, and wherein the second computer notifies the first computer of address information as the path information in the network assigned to each of the first and second interface devices capable of the ciphered communication by using the IPSec process.

6. A computer system according to claim 5, wherein the second computer further includes second information about first computer coupled to the network that can use the first logical volume in the first storage system, wherein based on the second information, the second computer transmits, to the first computer having issued the request, the path information to the first logical volume that is available for the first computer.

7. A computer system according to claim 6, wherein after receiving the notice from the one of the plurality of storage systems, the second computer registers, with the second information, information about the first computer having requested creation of the logical volume when notifying the first computer of the path information about the logical volume created in the one of the Plurality of storage systems.

8. A computer system according to claim 1, wherein the information about the plurality of storage systems is information about the security level of each of the plurality of storage systems and the first computer, wherein the request of the first computer is a request for creating the logical volume, and wherein the second computer checks the security level of the first computer based on the information, selects a first storage system of the Plurality of storage systems meeting the security level of the first computer based on the information, and commands the first storage system to create the logical volume depending on the security level of the first computer.

9. A computer system according to claim 8, wherein the first computer and each of the plurality of storage systems have an interface device coupled to the network for communicating with each other via the network, wherein the information about the security level is information about whether or not the interface device in each of the storage systems and the first computer can execute ciphered communication by using an IPSec process, and wherein when the security level of the first computer is in a level that the first computer has a first interface device which can execute ciphered communication by using the IPSec process, the second computer selects the first storage system which has a second interface device which can execute ciphered communication by using the IPSec process, and commands the first storage system to interrelate logical volume to the second interface device capable of the ciphered communication by using the IPSec process in the first storage system.

10. A computer system according to claim 1, wherein the information about the storage system is information about whether or not an interface device, which each of the plurality of storage systems has, and used for coupling with the network can execute ciphered communication by using an IPSec process, wherein the request of the first computer is a request for creating the logical volume, wherein based on the request for creating the logical volume, the second computer selects a first storage system of the plurality of storage systems that has a first interface device which can execute the ciphered communication by using the IPSec process, and transmits a command to the first storage system for creating the logical volume related to the first interface device capable of the ciphered communication by using the IPSec process in the first storage system, wherein in accordance with the command, the first storage system creates the logical volume and interrelates the created logical volume to the first interface device capable of the ciphered communication by using the IPSec process, and wherein the second computer notifies the first computer of address information as the path information in the network assigned to the first interface device capable of the ciphered communication by using the IPSec process.

11. A computer system according to claim 1, wherein the information about the storage system is information about whether or not an interface device, which each of the plurality of the storage systems has, and used for coupling with the network can execute ciphered communication by using an IPSec process, wherein the request of the first computer is a request for creating the logical volume, wherein based on the request for creating the logical volume, the second computer selects a first storage system of the plurality of storage systems which has a first interface device and a second interface device each of which can execute the ciphered communication by using IPSec process, and transmits a command to the first storage system for creating the logical volume, wherein in accordance with the command, the first storage system creates the logical volume, and interrelates the created logical volume to the first and second interface devices capable of the ciphered communication by using the IPSec process, and wherein the second computer notifies the first computer of address information as the path information in the network assigned to each of the first and second interface devices capable of the ciphered communication by using the IPSec process.

12. A computer according to claim 1, wherein the information about the storage system is information about whether or not an interface device, which each of the plurality of storage systems has, and used for coupling with the network can execute ciphered communication by using an IPSec process, wherein the request of the first computer is a request for creating the logical volume, wherein based on the request for creating the logical volume, the second computer selects a first storage system which has a first interface device which can execute the ciphered communication by using the IPSec process and has a second interface device which cannot execute the ciphered communication, and transmits a command to the first storage system for creating the logical volume, wherein in accordance with the command, the first storage system creates the logical volume and interrelates the created logical volume to the first interface device capable of the ciphered communication by using the IPSec process and to the second interface device incapable of the ciphered communication, and wherein the second computer notifies the first computer of address information as the path information in the network assigned to the first interface device and address information in the network assigned to the second interface device.

13. A computer system according to claim 12, wherein the first computer selects one address included in the address information received from the second computer to make access to the logical volume in the first storage system.

14. A computer system according to claim 13, wherein when the first computer is in need of the high security level for a accessing to the logical volume in the first storage system, the first computer selects the address information corresponding to the first interface device capable of the ciphered communication by using the IPSec process to make access to the logical volume in the first storage system.

15. A management computer coupled to a computer and a plurality of storage systems, comprising:

a control section;

a memory; and an interface to be coupled to a network and being coupled with the computer and the plurality of storage systems, wherein the memory includes information indicating whether or not an interface device, which each of the plurality of storage systems has to be coupled to the network is capable of ciphered communication by using an IPSec process, wherein when the computer makes a request to create a logical volume constructed on a physical disk device in one of the plurality of storage systems over the interface, the control section selects a first storage system which has a first interface device which can execute the ciphered communication by using the IPSec, and transmits, to the first storage system, a command for creating the logical volume and interrelating to the first interface device capable of the ciphered communication by using the IPSec process based on the request, and wherein after receiving a completion notice from the first storage system, the management computer notifies the computer of address information assigned to the first interface device capable of the ciphered communication by using the IPSec process.

16. A computer system, comprising:

a first computer;

a storage system to be coupled with the first computer over a network; and a second computer to be coupled to the first computer and the storage system, wherein the first computer sends a request for creating a logical volume constructed on a Physical disk in the storage system to the second computer, wherein the second computer has information about whether each of a plurality of interface devices in the storage system used for coupling with the network is capable of ciphered communication with the first computer by using an IPSec process, decides, in response to the request the storage system is in accordance with the information in the second computer, and transmits a command to the decided storage system for creating the logical volume and for interrelating the logical volume used by the first computer to one of the plurality of interface devices capable of the ciphered communication by using the IPSec process in the storage system, wherein the storage system creates the logical volume and interrelates the created logical volume to the one of the plurality of interface devices capable of the ciphered communication by using the IPSec process in accordance with the command, and forwards to the second computer a creation completion notice, wherein the second computer notifies the first computer of address information in the network assigned to one of the plurality of interface devices capable of the ciphered communication by using the IPSec process, wherein based on the address information, the first computer makes access to the logical volume in the storage system via the one of the plurality of interface devices capable of the ciphered communication by using the IPSec process.

* * * * *